(12) United States Patent
Field et al.

(10) Patent No.: US 11,789,533 B2
(45) Date of Patent: Oct. 17, 2023

(54) SYNCHRONIZATION BETWEEN BRAIN INTERFACE SYSTEM AND EXTENDED REALITY SYSTEM

(71) Applicant: HI LLC, Los Angeles, CA (US)

(72) Inventors: Ryan Field, Culver City, CA (US); Bryan Johnson, Culver City, CA (US); Gabriel Lerner, Los Angeles, CA (US); Antonio H. Lara, Valencia, CA (US)

(73) Assignee: HI LLC, Los Angeles, CA (US)

( * ) Notice: Subject to any disclaimer, the term of this patent is extended or adjusted under 35 U.S.C. 154(b) by 119 days.

(21) Appl. No.: 17/466,683

(22) Filed: Sep. 3, 2021

(65) Prior Publication Data

US 2022/0091672 A1    Mar. 24, 2022

Related U.S. Application Data

(60) Provisional application No. 63/139,478, filed on Jan. 20, 2021, provisional application No. 63/124,542,
(Continued)

(51) Int. Cl.
    *G06F 3/01*    (2006.01)
(52) U.S. Cl.
    CPC ..................... *G06F 3/015* (2013.01)
(58) Field of Classification Search
    CPC ....................................................... G06F 3/015
(Continued)

(56) References Cited

U.S. PATENT DOCUMENTS 5,853,370 A    12/1998 Chance et al.
6,240,309 B1    5/2001 Yamashita et al.
(Continued)

FOREIGN PATENT DOCUMENTS

KR    20200049930 A    5/2020
WO    2018033751    2/2018
WO    2018099436 A1    6/2018

OTHER PUBLICATIONS

United Nations, et al., "The Future is Decentralised Block Chains, Distributed Ledgers, & the Future of Sustainable Development", Retrieved online Feb. 6, 2022. (Nov. 15, 2017). https://www.undp.org/content/dam/undp/library/innovation/The-Future-is-Decentralised .pdf (Year: 2017).

(Continued)

*Primary Examiner* — Calvin C Ma
(74) *Attorney, Agent, or Firm* — ALG Intellectual Property, LLC

(57) ABSTRACT

An illustrative system includes an extended reality system and a brain interface system configured to be concurrently worn by a user. The extended reality system is configured to provide the user with an extended reality experience and output a timing signal while the extended reality experience is being provided to the user, the timing signal representing a plurality of timing events that occur during the extended reality experience. The brain interface system is configured to receive the timing signal from the extended reality system while the extended reality experience is being provided to the user, acquire brain activity measurements while the extended reality experience is being provided to the user, and output measurement timestamp data representative of a temporal association of the brain activity measurements with the timing events.

33 Claims, 19 Drawing Sheets

Related U.S. Application Data filed on Dec. 11, 2020, provisional application No. 63/086,350, filed on Oct. 1, 2020, provisional application No. 63/081,754, filed on Sep. 22, 2020.

(58) Field of Classification Search
USPC .................................................. 345/156, 173
See application file for complete search history.

(56) References Cited

U.S. PATENT DOCUMENTS

| | | | |
|---|---|---|---|
| 6,384,663 B2 | 5/2002 | Cova et al. | |
| 6,640,133 B2 | 10/2003 | Yamashita | |
| 6,683,294 B1 | 1/2004 | Herbert et al. | |
| 7,356,365 B2 | 4/2008 | Schurman | |
| 7,547,872 B2 | 6/2009 | Niclass et al. | |
| 7,774,047 B2 | 8/2010 | Yamashita et al. | |
| 8,026,471 B2 | 9/2011 | Itzler | |
| 8,078,250 B2 | 12/2011 | Chen et al. | |
| 8,082,015 B2 | 12/2011 | Yodh et al. | |
| 8,633,431 B2 | 1/2014 | Kim | |
| 8,817,257 B2 | 8/2014 | Herve | |
| 9,058,081 B2 | 6/2015 | Baxter | |
| 9,076,707 B2 | 7/2015 | Harmon | |
| 9,131,861 B2 | 9/2015 | Ince et al. | |
| 9,316,735 B2 | 4/2016 | Baxter | |
| 9,401,448 B2 | 7/2016 | Bienfang et al. | |
| 9,419,635 B2 | 8/2016 | Kumar et al. | |
| 9,442,201 B2 | 9/2016 | Schmand et al. | |
| 9,529,079 B1 | 12/2016 | Droz | |
| 9,574,936 B2 | 2/2017 | Heinonen | |
| 9,946,344 B2 | 4/2018 | Ayaz et al. | |
| D817,553 S | 5/2018 | Aaskov et al. | |
| D825,112 S | 8/2018 | Saez | |
| 10,158,038 B1 | 12/2018 | Do Valle et al. | |
| 10,340,408 B1 | 7/2019 | Katnani | |
| 10,424,683 B1 | 9/2019 | Do Valle | |
| 10,515,993 B2 | 12/2019 | Field et al. | |
| 10,697,829 B2 | 6/2020 | Delic | |
| 10,772,561 B2 | 9/2020 | Donaldson | |
| 10,809,796 B2 | 10/2020 | Armstrong-Muntner | |
| 10,912,504 B2 | 2/2021 | Nakaji | |
| 11,006,876 B2 | 5/2021 | Johnson | |
| 11,006,878 B2 | 5/2021 | Johnson | |
| 2007/0083097 A1 | 4/2007 | Fujiwara | |
| 2009/0012402 A1 | 1/2009 | Mintz | |
| 2010/0219820 A1 | 9/2010 | Skidmore et al. | |
| 2011/0208675 A1 | 8/2011 | Shoureshi et al. | |
| 2013/0342835 A1 | 12/2013 | Blacksberg | |
| 2014/0191115 A1 | 7/2014 | Webster et al. | |
| 2014/0217264 A1 | 8/2014 | Shepard | |
| 2014/0275891 A1 | 9/2014 | Muehlemann et al. | |
| 2015/0038811 A1 | 2/2015 | Asaka | |
| 2015/0041625 A1 | 2/2015 | Dutton | |
| 2015/0054111 A1 | 2/2015 | Niclass et al. | |
| 2015/0077279 A1 | 3/2015 | Song | |
| 2015/0150505 A1 | 6/2015 | Kaskoun et al. | |
| 2015/0199010 A1* | 7/2015 | Coleman | H04L 12/16 345/156 |
| 2015/0324692 A1 | 11/2015 | Ritchey et al. | |
| 2015/0327777 A1 | 11/2015 | Kostic et al. | |
| 2015/0364635 A1 | 12/2015 | Bodlovic et al. | |
| 2017/0030769 A1 | 2/2017 | Clemens et al. | |
| 2017/0052065 A1 | 2/2017 | Sharma et al. | |
| 2017/0176596 A1 | 6/2017 | Shpunt et al. | |
| 2017/0179173 A1 | 6/2017 | Mandai et al. | |
| 2017/0202518 A1 | 7/2017 | Furman et al. | |
| 2017/0259167 A1* | 9/2017 | Cook | A63F 13/212 |
| 2017/0281086 A1 | 10/2017 | Donaldson | |
| 2017/0363467 A1 | 12/2017 | Clemens et al. | |
| 2017/0367650 A1 | 12/2017 | Wallois | |
| 2018/0014741 A1 | 1/2018 | Chou | |
| 2018/0027196 A1 | 1/2018 | Yang et al. | |
| 2018/0039053 A1 | 2/2018 | Kremer et al. | |
| 2018/0070830 A1 | 3/2018 | Sutin et al. | |
| 2018/0070831 A1 | 3/2018 | Sutin et al. | |
| 2018/0089848 A1 | 3/2018 | Yang et al. | |
| 2019/0033914 A1 | 1/2019 | Aimone et al. | |
| 2019/0091483 A1 | 3/2019 | Deckert | |
| 2019/0113385 A1 | 4/2019 | Fukuchi | |
| 2019/0175068 A1 | 6/2019 | Everdell | |
| 2019/0286234 A1 | 9/2019 | Condolo | |
| 2019/0307350 A1 | 10/2019 | Sridhar et al. | |
| 2019/0327124 A1* | 10/2019 | Lai | G01S 5/017 |
| 2019/0355861 A1 | 11/2019 | Katnani | |
| 2019/0363210 A1 | 11/2019 | Do Valle | |
| 2019/0388018 A1 | 12/2019 | Horstmeyer et al. | |
| 2020/0022581 A1 | 1/2020 | Vanegas | |
| 2020/0060542 A1 | 2/2020 | Alford | |
| 2020/0116838 A1 | 4/2020 | Erdogan | |
| 2020/0196932 A1 | 6/2020 | Johnson | |
| 2020/0201434 A1 | 6/2020 | Aliamiri | |
| 2020/0253479 A1 | 8/2020 | Nurmikko | |
| 2020/0315510 A1 | 10/2020 | Johnson | |
| 2020/0337624 A1 | 10/2020 | Johnson | |
| 2020/0390358 A1 | 12/2020 | Johnson | |

OTHER PUBLICATIONS

Dey, et al., "Exploration of an EEG-Based Cognitively Adaptive Training System in Virtual Reality", 2019 IEEE Conference on Virtual REality and 3D User Interfaces (VR), IEEE, Mar. 23, 2019, pp. 220-226, XP033597512, DOI 10.1109/VR.2019.8797840.

Skola, et al., "Examining the effect of body ownership in immersive virtual and augmented reality environments", Visual Computer, Springer, Berlin, DE, vol. 32, No. 6, May 23, 2016, pp. 761-770, EX035982449, ISSN: 0178-2789, DOI: 10.1007/S00371-016-1246-8.

Alayed, et al., "Characterization of a Time-Resolved Diffuse Optical Spectroscopy Prototype Using Low-Cost, Compact Single Photon Avalanche Detectors for Tissue Optics Applications", Sensors 2018, 18, 3680; doi:10.3390/s18113680, Oct. 29, 2018.

Alem, O. et al., "Magnetic Field imaging with Microfabricated Optically-Pumped Magnetometers", Opt. Express 25, 7849-7858 (2017).

Ban, et al., "Kernel Flow: a high channel count scalable TD-fNIRS system", https://www.spiedigitallibrary.org/conference-proceedings-of-spie Proc. of SPIE vol. 11663, 116630B CCC code: 1605-7422/21/$21 doi: 10.1117/12.2582888, Mar. 5, 2021.

Baranga, et al., "An Atomic Magnetometer for Brain Activity Imaging", Real Time Conference 2005, 14th IEEE-NPSS. pp. 417-418, (2005).

Borna, et al., "A 20-Channel Magnetoencephalography System Based on Optically Pumped Magnetometers", Phys Med Biol. Author manuscript; available in PMC Nov. 10, 2018 (2018).

Borna, A. et al., "A 20-Channel Magnetoencephalography System Based on Optically Pumped Magnetometers", Physics in Medicine & Biology 62.23 (2017): 8909.

Borna, et al., "Non-invasive Functional-Brain-Imaging with an OPM-based Magnetoencephalography System", PLoS ONE 15 (1): e0227684. https://doi.org/10.1371/journal.pone.0227684 (2014).

Boto, E. et al., "Moving Magnetoencephalography Towards Real World Applications with a Wearable System", Nature, vol. 555, pp. 657-661 (2018).

Boto, et al., "Moving magnetoencephalography towards real-world applications with a wearable system", Nature. Author manuscript; available in PMC Sep. 21, 2018 (2018).

Budker, D. et al., "Optical Magnetometry", Nature Physics, 2008, https://arxiv.org/abs/physics/0611246v1.

Contini, et al., "Photon migration through a turbid slab described by a model based on diffusion approximation. I. Theory", Appl. Opt. 36(19), 4587 (1997).

Di Sieno, et al., "Probe-hosted large area silicon photomultiplier and high-throughput timing electronics for enhanced performance time-domain functional near-infrared spectroscopy", Biomed. Opt. Express 11(11), 6389 (2020).

Fishburn, et al., "Temporal Derivative Distribution Repair (TDDR): A motion correction method for fNIRS", Neuroimage. Jan. 1, 2019; 184: 171-179. doi:10.1016/j.neuroimage.2018.09.025.

(56) References Cited

OTHER PUBLICATIONS

Hamalainen, M. et al., "Magnetoencephalograph—Theory, Instrumentation, and Applications to Noninvasive Studies of the Working Human Brain", Reviews of Modern Physics, vol. 65, Issue 2. 413-497 (1993).

Hill, R.M. et al., "A Tool for Functional Brain Imaging with Lifespan Compliance", Nature Communication (2019) 10:4785. https://doi.org/10.1038/s41467-019-12486-x.

Hill, R.M. et al., "Multi-Channel Whole-Head OPM-MEG: Helmet Design and a Comparison with a Conventional System", NeuroImage vol. 219 (2020) 116995. https://doi.org/10.1016/j.neuroimage.2020.116995.

Huppert, et al., "HomER: a review of time-series analysis methods for near-infrared spectroscopy of the brain", Appl. Opt. 48(10), D280 (2009).

Iivanainen, et al., "Measuring MEG closer to the brain: Performance of on-scalp sensor arrays", NeuroImage 147 (2017) 542-553 http://dx.doi.org/10.1016/j.neuroimage.2016.12.048.

Iivanainen, et al., "On-scalp MEG system utilizing an actively shielded array of optically-pumped magnetometers", NeuroImage 194 (2019) 244-258 https://doi.org/10.1016/j.neuroimage.2019.03.022.

Kienle, et al., "Improved solutions of the steady-state and the time-resolved diffusion equations for reflectance from a semi-infinite turbid medium", J. Opt. Soc. Am. A 14(1), 246 (1997).

Kim, K. et al., "Multi-Channel Atomic Magnetometer for Magnetoencephalography: A Configuration Study", NeuroImage 89 (2014) 143-151 https://physics.princeton.edu/romalis/papers/Kim_2014.pdf.

Konugolu, et al., "Broadband (600-1350 nm) Time-Resolved Diffuse Optical Spectrometer for Clinical Use", IEEE Journal of Selected Topics in Quantum Electronics, vol. 22, No. 3, May/Jun. 2016.

Lacerenza, et al., "Wearable and wireless time-domain near-infrared spectroscopy system for brain and muscle hemodynamic monitoring", Biomed. Opt. Express 11(10), 5934 (2020).

Lange, et al., "Clinical Brain Monitoring with Time Domain NIRS: A Review and Future Perspectives", Applied Sciences 9(8), 1612 (2019).

Lange, et al., "MAESTROS: A Multiwavelength Time-Domain NIRS System to Monitor Changes in Oxygenation and Oxidation State of Cytochrome-C-Oxidase", IEEE J. Select. Topics Quantum Electron. 25(1), 1-12 (2019).

Martelli, et al., "Optimal estimation reconstruction of the optical properties of a two-layered tissue phantom from time-resolved single-distance measurements", Journal of Biomedical Optics 20(11), 115001 (Nov. 2015).

Mellinger, et al., "An MEG-based Brain-Computer Interface (BCI)", Neuroimage. Jul. 1, 2007; 36(3): 581-593.

Mora, et al., "Fast silicon photomultiplier improves signal harvesting and reduces complexity in time-domain diffuse optics", Opt. Express 23(11), 13937 (2015).

Pifferi, et al., "Performance assessment of photon migration instruments: the MEDPHOT protocol", Applied Optics, 44(11), 2104-2114 (2005).

Pineda, et al., "Learning to Control Brain Rhythms: Making A Brain-Computer Interface Possible", IEEE Transactions on Neural Systems and Rehabilitation Engineering Jun. 2003;11(2):181-4 (2003).

Pour, et al., "Brain-Computer Interface: Next Generation Thought Controlled Distributed Video Game Development Platform", 2008 IEEE Symposium on Computational Intelligence and Games (CIG'08) pp. 251-257 (2008).

Prahl, et al., "Optical Absorption of Hemoglobin", http://omlc.ogi.edu/spectra/hemoglobin/index.html (1999).

Re, et al., "Multi-channel medical device for time domain functional near infrared spectroscopy based on wavelength space multiplexing", Biomed. Opt. Express 4(10), 2231 (2013).

Renna, et al., "Eight-Wavelength, Dual Detection Channel Instrument for Near-Infrared Time-Resolved Diffuse Optical Spectroscopy", IEEE J. Select. Topics Quantum Electron. 25(1), 1-11 (2019).

Robinson, et al., "Developing Next-Generation Brain Sensing Technologies—A Review", IEEE Sensors Journal, vol. 19, No. 22, Nov. 15, 2019.

Sander, T.H. et al., "Magnetoencephalography with a Chip-Scale Atomic Magnetometer", Biomed Opt Express. 2012;3(5):981-90.

Tierney, T.M. et al., "Cognitive Neuroscience Using Wearable Magnetometer Arrays: Non-Invasive Assessment of Language Function", NeuroImage vol. 181 (2018) pp. 513-520. https://doi.org/10.1016/j.neuroimage.2018.07.035.

Torricelli, et al., "Time domain functional NIRS imaging for human brain mapping", NeuroImage 85, 28-50 (2014).

Wabnitz, et al., "Depth-selective data analysis for time-domain fNIRS: moments vs. time windows", Biomed. Opt. Express 11(8), 4224 (2020).

Wabnitz, et al., "Performance assessment of time-domain optical brain imagers, part 1: basic instrumental performance protocol", Journal of Biomedical Optics 19(8), 086010 (Aug. 2014).

Wabnitz, et al., "Performance assessment of time-domain optical brain imagers, part 2: nEUROPt protocol", Journal of Biomedical Optics 19(8), 086012 (Aug. 2014).

Wojtkiewicz, et al., "Self-calibrating time-resolved near infrared spectroscopy", Biomed. Opt. Express 10(5), 2657(2019).

Wolpaw, et al., "An EEG-based brain-computer interface for cursor control", Electroencephalography and clinical Neurophysiology, 1991, 78:252-259.

Zetter, R. et al., "Optical Co-registration of MRI and On-scalp MEG", Scientific Reports (2019) 9:5490. https://doi.org/10.1038/S41598-019-41763-4.

Zucchelli, et al., "Method for the discrimination of superficial and deep absorption variations by time domain fNIRS", 2013 OSA Dec. 1, 2013 | vol. 4, No. 12 | DOI:10.1364/BOE.4.002893 | Biomedical Optics Express 2893.

\* cited by examiner

SYNCHRONIZATION BETWEEN BRAIN INTERFACE SYSTEM AND EXTENDED REALITY SYSTEM

RELATED APPLICATIONS

The present application claims priority under 35 U.S.C. § 119(e) to U.S. Provisional Patent Application No. 63/139,478, filed on Jan. 20, 2021, U.S. Provisional Patent Application No. 63/124,542, filed on Dec. 11, 2020, U.S. Provisional Patent Application No. 63/086,350, filed on Oct. 1, 2020, and U.S. Provisional Patent Application No. 63/081,754, filed on Sep. 22, 2020. These applications are incorporated herein by reference in their respective entireties.

BACKGROUND INFORMATION

Neuroscience studies that involve the use of brain interface systems (e.g., magnetic resonance imaging (MRI) machines, functional MRI (fMRI) machines, electroencephalography (EEG) equipment, optical signal measurement systems, etc.) are often affected by varying environmental conditions. For example, variations in lighting, peripheral noise, room size, and study parameters used for different participants in a neuroscience study may be difficult or even impossible to account for in the results of the neuroscience study.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION

Figure 1:
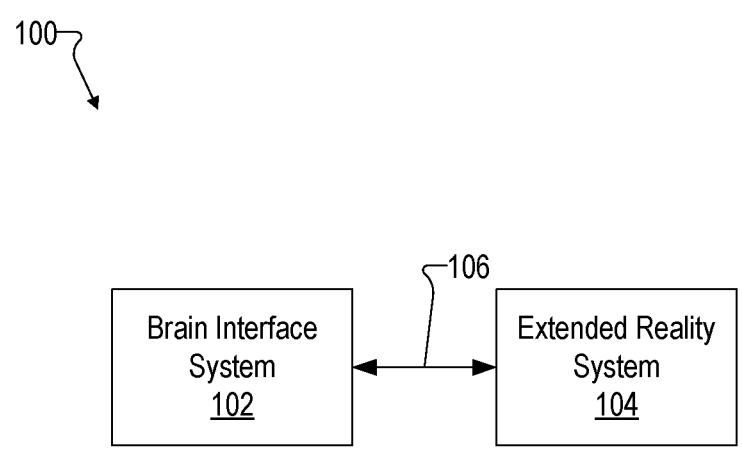
FIG. 1 shows an exemplary wearable extended reality-based neuroscience analysis system.

Wearable extended reality-based neuroscience analysis systems and methods are described herein. For example, an illustrative system may include an extended reality system and a brain interface system configured to be concurrently worn by a user. The extended reality system may be configured to provide the user with an extended reality experience (e.g., an immersive virtual reality experience or a non-immersive augmented reality experience). The brain interface system may be configured to acquire one or more brain activity measurements while the extended reality experience is being provided to the user.

As demonstrated herein, the concurrent use of a wearable extended reality system and a wearable brain interface system may provide various benefits and advantages over conventional neuroscience study configurations. For example, the systems and methods described herein may reduce (e.g., eliminate) study variances due to variable environmental conditions (e.g., lighting conditions, peripheral noise, room size and/or material, etc.); create perceived naturalistic motion for users without too much actual motion; enable safe, remote and simultaneous social interaction between users; improve generalizability to real-world tasks beyond what is possible in the laboratory; and/or standardize task/stimulus design and hardware calibrations to be "plug and play" regardless of the environment in which neuroscience studies may be performed. Moreover, virtual reality in particular has the potential to expand the reach of neuroscience through enabling real-time neurofeedback in a fully immersive environment. This may open up a realm of possibilities in the fields of training, education, and/or general self-improvement. All of these factors contribute to increased replicability, study power, and ecological relevance compared to conventional neuroscience study configurations that do not incorporate the use of extended reality.

Synchronization between a brain interface system and an extended reality system is also described herein. For example, an illustrative system may include an extended reality system and a brain interface system configured to be concurrently worn by a user. The extended reality system may be configured to provide the user with an extended reality experience and output a timing signal (e.g., an audio signal) while the extended reality experience is being provided to the user. The timing signal may represent a plurality of timing events that occur during the extended reality experience. The extended reality system may be further configured to output extended reality event timestamp data representative of a temporal association of extended reality events with the timing events, the extended reality events occurring while the extended reality experience is being provided to the user.

The brain interface system in this example may be configured to receive the timing signal from the extended reality system while the extended reality experience is being provided to the user, acquire brain activity measurements while the extended reality experience is being provided to the user, and output measurement timestamp data representative of a temporal association of the brain activity measurements with the timing events.

Because the measurement timestamp data output by the brain interface system and the extended reality event timestamp data output by the extended reality event timestamp data are based on the same timing signal, a processing system communicatively coupled to the extended reality system and/or the brain interface system may be configured to synchronize the measurement timestamp data with the extended reality event timestamp data. This may allow researchers and/or others to ascertain correlations between extended reality events and brain activity measurements.

Coupled with extremely high-dimensional behavioral data (e.g., eye-tracking, motion tracking, etc., with the possibility of thousands of events logged from the extended reality system every second), a wearable brain interface system configured to function in a time-synchronized manner with a wearable extended reality system may provide a number of benefits and advantages over conventional neuroscience analysis systems. For example, the systems and methods described herein may provide a scalable ecosystem that may be used to facilitate neuroscience studies and experiments that involve users located at any suitable location (e.g., in their homes, in their classroom, in separate laboratories, in laboratories located in various locations, etc.). The systems and methods described herein can also reach subjects/patients who normally cannot be confined in a hospital environment due to limiting health or mobility concerns.

FIG. 1 shows an exemplary wearable extended reality-based neuroscience analysis system 100 ("wearable system 100"). As shown, wearable system 100 includes a brain interface system 102 and an extended reality system 104 coupled by way of a communication link 106.

Brain interface system 102 may be implemented by any suitable wearable non-invasive brain interface system as may serve a particular implementation. For example, brain interface system 102 may be implemented by a wearable optical measurement system configured to perform optical-based brain data acquisition operations, such as any of the wearable optical measurement systems described in U.S. patent application Ser. No. 17/176,315, filed Feb. 16, 2021; U.S. patent application Ser. No. 17/176,309, filed Feb. 16, 2021; U.S. patent application Ser. No. 17/176,460, filed Feb. 16, 2021; U.S. patent application Ser. No. 17/176,470, filed Feb. 16, 2021; U.S. patent application Ser. No. 17/176,487, filed Feb. 16, 2021; U.S. patent application Ser. No. 17/176,539, filed Feb. 16, 2021; U.S. patent application Ser. No. 17/176,560, filed Feb. 16, 2021; U.S. patent application Ser. No. 17/176,466, filed Feb. 16, 2021, and Han Y. Ban, et al., "Kernel Flow: A High Channel Count Scalable TD-fNIRS System," SPIE Photonics West Conference (Mar. 6, 2021), which applications and publication are incorporated herein by reference in their entirety.

To illustrate, FIGS. 2-4, 5A, and 5B show various optical measurement systems and related components that may implement brain interface system 102. The optical measurement systems described herein are merely illustrative of the many different optical-based brain interface systems that may be used in accordance with the systems and methods described herein.

Figure 2:
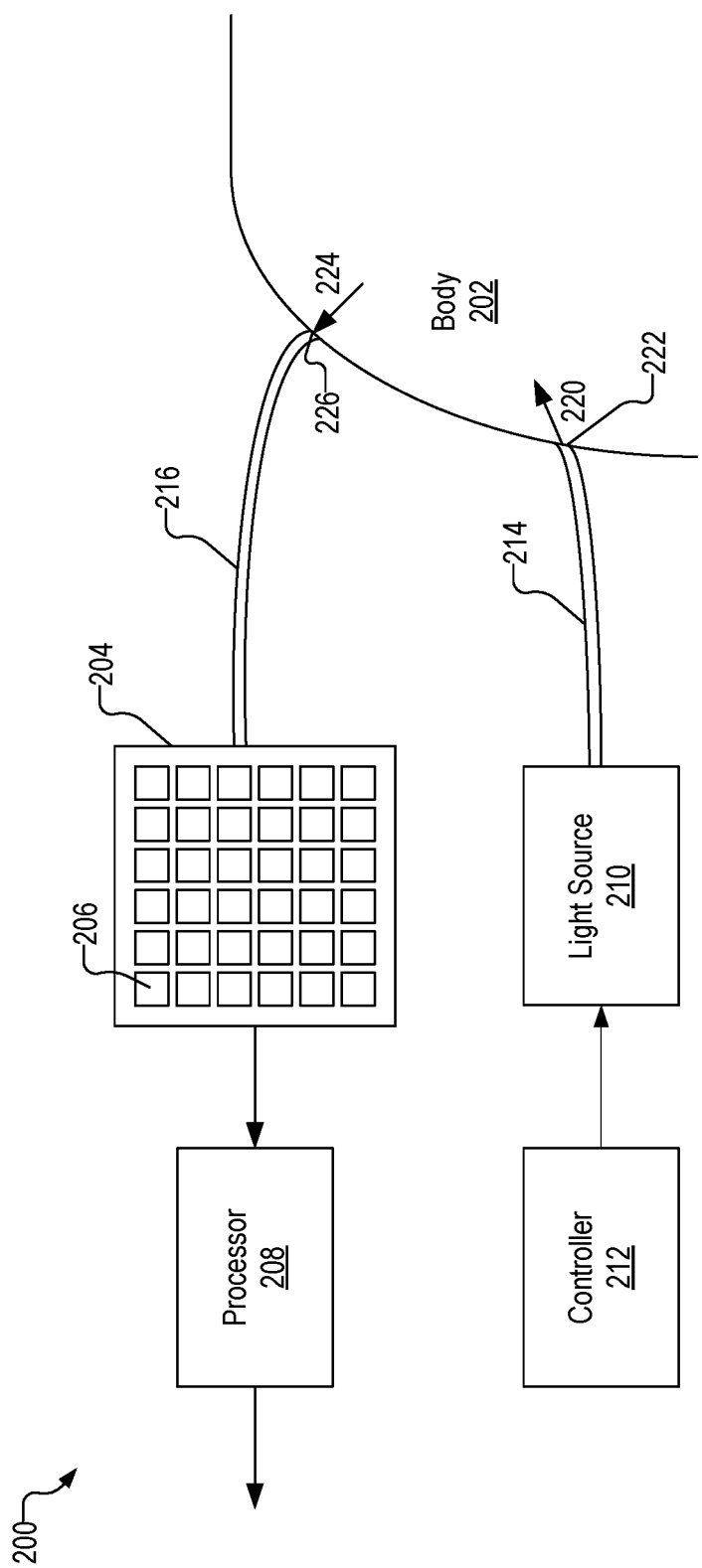
FIGS. 2-4, 5A and 5B show various optical measurement systems that may implement the brain interface system of FIG. 1.

FIG. 2 shows an optical measurement system 200 that may be configured to perform an optical measurement operation with respect to a body 202 (e.g., the brain). Optical measurement system 200 may, in some examples, be portable and/or wearable by a user.

In some examples, optical measurement operations performed by optical measurement system 200 are associated with a time domain-based optical measurement technique. Example time domain-based optical measurement techniques include, but are not limited to, time-correlated single-photon counting (TCSPC), time domain near infrared spectroscopy (TD-NIRS), time domain diffusive correlation spectroscopy (TD-DCS), and time domain digital optical tomography (TD-DOT).

Optical measurement system 200 (e.g., an optical measurement system that is implemented by a wearable device or other configuration, and that employs a time domain-based (e.g., TD-NIRS) measurement technique) may detect blood oxygenation levels and/or blood volume levels by measuring the change in shape of laser pulses after they have passed through target tissue, e.g., brain, muscle, finger, etc. As used herein, a shape of laser pulses refers to a temporal shape, as represented for example by a histogram generated by a time-to-digital converter (TDC) coupled to an output of a photodetector, as will be described more fully below.

As shown, optical measurement system 200 includes a detector 204 that includes a plurality of individual photodetectors (e.g., photodetector 206), a processor 208 coupled to detector 204, a light source 210, a controller 212, and optical conduits 214 and 216 (e.g., light pipes). However, one or more of these components may not, in certain embodiments, be considered to be a part of optical measurement system 200. For example, in implementations where optical measurement system 200 is wearable by a user, processor 208 and/or controller 212 may in some embodiments be separate from optical measurement system 200 and not configured to be worn by the user.

Detector 204 may include any number of photodetectors 206 as may serve a particular implementation, such as $2^n$ photodetectors (e.g., 256, 512, ..., 26384, etc.), where n is an integer greater than or equal to one (e.g., 4, 5, 8, 20, 21, 24, etc.). Photodetectors 206 may be arranged in any suitable manner.

Photodetectors 206 may each be implemented by any suitable circuit configured to detect individual photons of light incident upon photodetectors 206. For example, each photodetector 206 may be implemented by a single photon avalanche diode (SPAD) circuit and/or other circuitry as may serve a particular implementation. The SPAD circuit may be gated in any suitable manner or be configured to operate in a free running mode with passive quenching. For example, photodetectors 206 may be configured to operate in a free-running mode such that photodetectors 206 are not actively armed and disarmed (e.g., at the end of each predetermined gated time window). In contrast, while operating in the free-running mode, photodetectors 206 may be configured to reset within a configurable time period after an occurrence of a photon detection event (i.e., after photodetector 206 detects a photon) and immediately begin detecting new photons. However, only photons detected within a desired time window (e.g., during each gated time window) may be included in the histogram that represents a light pulse response of the target (e.g., a temporal point spread function (TPSF)). The terms histogram and TPSF are used interchangeably herein to refer to a light pulse response of a target.

Processor 208 may be implemented by one or more physical processing (e.g., computing) devices. In some examples, processor 208 may execute instructions (e.g., software) configured to perform one or more of the operations described herein.

Light source 210 may be implemented by any suitable component configured to generate and emit light. For example, light source 210 may be implemented by one or more laser diodes, distributed feedback (DFB) lasers, super luminescent diodes (SLDs), light emitting diodes (LEDs), diode-pumped solid-state (DPSS) lasers, super luminescent light emitting diodes (sLEDs), vertical-cavity surface-emitting lasers (VCSELs), titanium sapphire lasers, micro light emitting diodes (mLEDs), and/or any other suitable laser or light source. In some examples, the light emitted by light source 210 is high coherence light (e.g., light that has a coherence length of at least 5 centimeters) at a predetermined center wavelength.

Light source 210 is controlled by controller 212, which may be implemented by any suitable computing device (e.g., processor 208), integrated circuit, and/or combination of hardware and/or software as may serve a particular implementation. In some examples, controller 212 is configured to control light source 210 by turning light source 210 on and off and/or setting an intensity of light generated by light source 210. Controller 212 may be manually operated by a user, or may be programmed to control light source 210 automatically.

Light emitted by light source 210 may travel via an optical conduit 214 (e.g., a light pipe, a single-mode optical fiber, and/or or a multi-mode optical fiber) to body 202 of a subject. Body 202 may include any suitable turbid medium. For example, in some implementations, body 202 is a brain or any other body part of a human or other animal. Alternatively, body 202 may be a non-living object. For illustrative purposes, it will be assumed in the examples provided herein that body 202 is a human brain.

As indicated by arrow 220, the light emitted by light source 210 enters body 202 at a first location 222 on body 202. Accordingly, a distal end of optical conduit 214 may be positioned at (e.g., right above, in physical contact with, or physically attached to) first location 222 (e.g., to a scalp of the subject). In some examples, the light may emerge from optical conduit 214 and spread out to a certain spot size on body 202 to fall under a predetermined safety limit. At least a portion of the light indicated by arrow 220 may be scattered within body 202.

As used herein, "distal" means nearer, along the optical path of the light emitted by light source 210 or the light received by detector 204, to the target (e.g., within body 202) than to light source 210 or detector 204. Thus, the distal end of optical conduit 214 is nearer to body 202 than to light source 210, and the distal end of optical conduit 216 is nearer to body 202 than to detector 204. Additionally, as used herein, "proximal" means nearer, along the optical path of the light emitted by light source 210 or the light received by detector 204, to light source 210 or detector 204 than to body 202. Thus, the proximal end of optical conduit 214 is nearer to light source 210 than to body 202, and the proximal end of optical conduit 216 is nearer to detector 204 than to body 202.

As shown, the distal end of optical conduit 216 (e.g., a light pipe, a light guide, a waveguide, a single-mode optical fiber, and/or a multi-mode optical fiber) is positioned at (e.g., right above, in physical contact with, or physically attached to) output location 226 on body 202. In this manner, optical conduit 216 may collect at least a portion of the scattered light (indicated as light 224) as it exits body 202 at location 226 and carry light 224 to detector 204. Light 224 may pass through one or more lenses and/or other optical elements (not shown) that direct light 224 onto each of the photodetectors 206 included in detector 204. In cases where optical conduit 216 is implemented by a light guide, the light guide may be spring loaded and/or have a cantilever mechanism to allow for conformably pressing the light guide firmly against body 202.

Photodetectors 206 may be connected in parallel in detector 204. An output of each of photodetectors 206 may be accumulated to generate an accumulated output of detector 204. Processor 208 may receive the accumulated output and determine, based on the accumulated output, a temporal distribution of photons detected by photodetectors 206. Processor 208 may then generate, based on the temporal distribution, a histogram representing a light pulse response of a target (e.g., brain tissue, blood flow, etc.) in body 202. Such a histogram is illustrative of the various types of brain activity measurements that may be performed by brain interface system 102.

Figure 3:
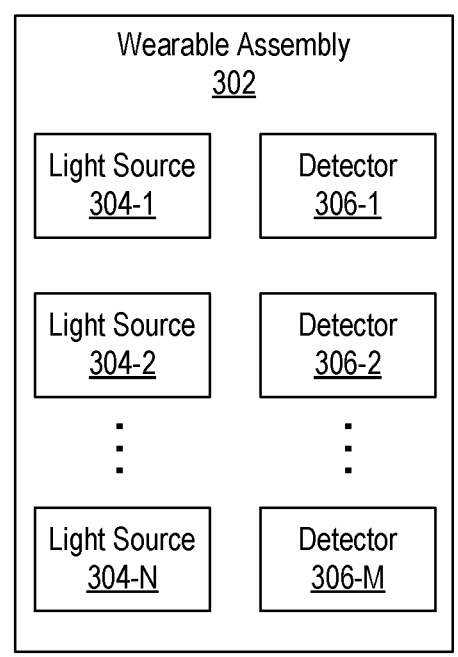

FIG. 3 shows an exemplary optical measurement system 300 in accordance with the principles described herein. Optical measurement system 300 may be an implementation of optical measurement system 200 and, as shown, includes a wearable assembly 302, which includes N light sources 304 (e.g., light sources 304-1 through 304-N) and M detectors 306 (e.g., detectors 306-1 through 306-M). Optical measurement system 300 may include any of the other components of optical measurement system 200 as may serve a particular implementation. N and M may each be any suitable value (i.e., there may be any number of light sources 304 and detectors 306 included in optical measurement system 300 as may serve a particular implementation).

Light sources 304 are each configured to emit light (e.g., a sequence of light pulses) and may be implemented by any of the light sources described herein. Detectors 306 may each be configured to detect arrival times for photons of the light emitted by one or more light sources 304 after the light is scattered by the target. For example, a detector 306 may include a photodetector configured to generate a photodetector output pulse in response to detecting a photon of the light and a time-to-digital converter (TDC) configured to record a timestamp symbol in response to an occurrence of the photodetector output pulse, the timestamp symbol representative of an arrival time for the photon (i.e., when the photon is detected by the photodetector).

Wearable assembly 302 may be implemented by any of the wearable devices, modular assemblies, and/or wearable units described herein. For example, wearable assembly 302 may be implemented by a wearable device (e.g., headgear) configured to be worn on a user's head. Wearable assembly 302 may additionally or alternatively be configured to be worn on any other part of a user's body.

Optical measurement system 300 may be modular in that one or more components of optical measurement system 300 may be removed, changed out, or otherwise modified as may serve a particular implementation. As such, optical measurement system 300 may be configured to conform to three-dimensional surface geometries, such as a user's head. Exemplary modular optical measurement systems comprising a plurality of wearable modules are described in more detail in one or more of the patent applications incorporated herein by reference.

Figure 4:
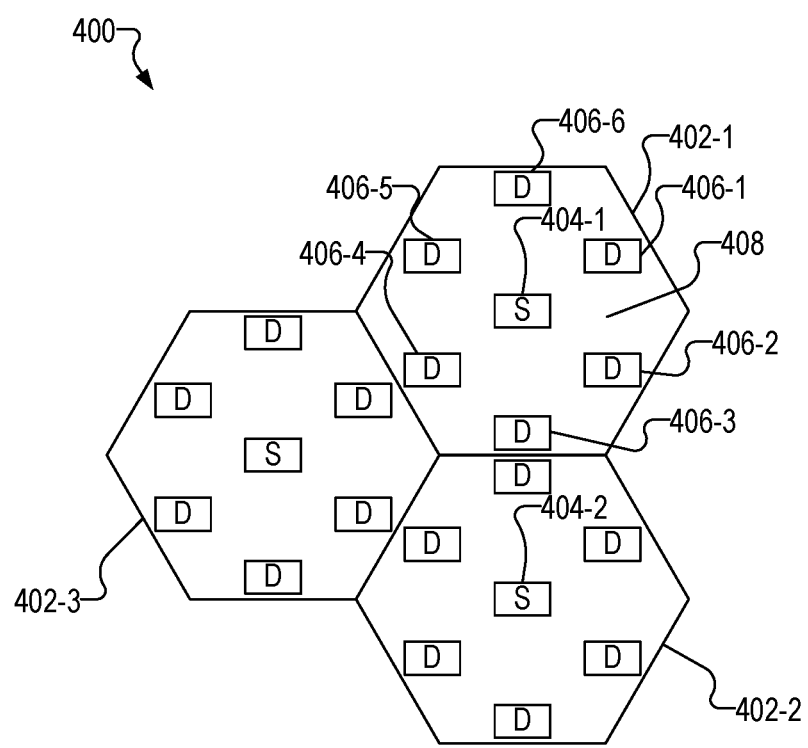

FIG. 4 shows an illustrative modular assembly 400 that may implement optical measurement system 300. Modular assembly 400 is illustrative of the many different implementations of optical measurement system 300 that may be realized in accordance with the principles described herein.

As shown, modular assembly 400 includes a plurality of modules 402 (e.g., modules 402-1 through 402-3) physically distinct one from another. While three modules 402 are shown to be included in modular assembly 400, in alternative configurations, any number of modules 402 (e.g., a single module up to sixteen or more modules) may be included in modular assembly 400.

Each module 402 includes a light source (e.g., light source 404-1 of module 402-1 and light source 404-2 of module 402-2) and a plurality of detectors (e.g., detectors 406-1 through 406-6 of module 402-1). In the particular implementation shown in FIG. 4, each module 402 includes a single light source and six detectors. Each light source is labeled "S" and each detector is labeled "D".

Each light source depicted in FIG. 4 may be implemented by one or more light sources similar to light source 210 and may be configured to emit light directed at a target (e.g., the brain).

Each light source depicted in FIG. 4 may be located at a center region of a surface of the light source's corresponding module. For example, light source 404-1 is located at a center region of a surface 408 of module 402-1. In alternative implementations, a light source of a module may be located away from a center region of the module.

Each detector depicted in FIG. 4 may implement or be similar to detector 204 and may include a plurality of photodetectors (e.g., SPADs) as well as other circuitry (e.g., TDCs), and may be configured to detect arrival times for photons of the light emitted by one or more light sources after the light is scattered by the target.

The detectors of a module may be distributed around the light source of the module. For example, detectors 406 of module 402-1 are distributed around light source 404-1 on surface 408 of module 402-1. In this configuration, detectors 406 may be configured to detect photon arrival times for photons included in light pulses emitted by light source 404-1. In some examples, one or more detectors 406 may be close enough to other light sources to detect photon arrival times for photons included in light pulses emitted by the other light sources. For example, because detector 406-3 is adjacent to module 402-2, detector 406-3 may be configured to detect photon arrival times for photons included in light pulses emitted by light source 404-2 (in addition to detecting photon arrival times for photons included in light pulses emitted by light source 404-1).

In some examples, the detectors of a module may all be equidistant from the light source of the same module. In other words, the spacing between a light source (i.e., a distal end portion of a light source optical conduit) and the detectors (i.e., distal end portions of optical conduits for each detector) are maintained at the same fixed distance on each module to ensure homogeneous coverage over specific areas and to facilitate processing of the detected signals. The fixed spacing also provides consistent spatial (lateral and depth) resolution across the target area of interest, e.g., brain tissue. Moreover, maintaining a known distance between the light source, e.g., light emitter, and the detector allows subsequent processing of the detected signals to infer spatial (e.g., depth localization, inverse modeling) information about the detected signals. Detectors of a module may be alternatively disposed on the module as may serve a particular implementation.

In some examples, modular assembly 400 can conform to a three-dimensional (3D) surface of the human subject's head, maintain tight contact of the detectors with the human subject's head to prevent detection of ambient light, and maintain uniform and fixed spacing between light sources and detectors. The wearable module assemblies may also accommodate a large variety of head sizes, from a young child's head size to an adult head size, and may accommodate a variety of head shapes and underlying cortical morphologies through the conformability and scalability of the wearable module assemblies. These exemplary modular assemblies and systems are described in more detail in U.S. patent application Ser. Nos. 17/176,470; 17/176,487; 17/176,539; 17/176,560; 17/176,460; and 17/176,466, which applications have been previously incorporated herein by reference in their respective entireties.

Figure 5A:
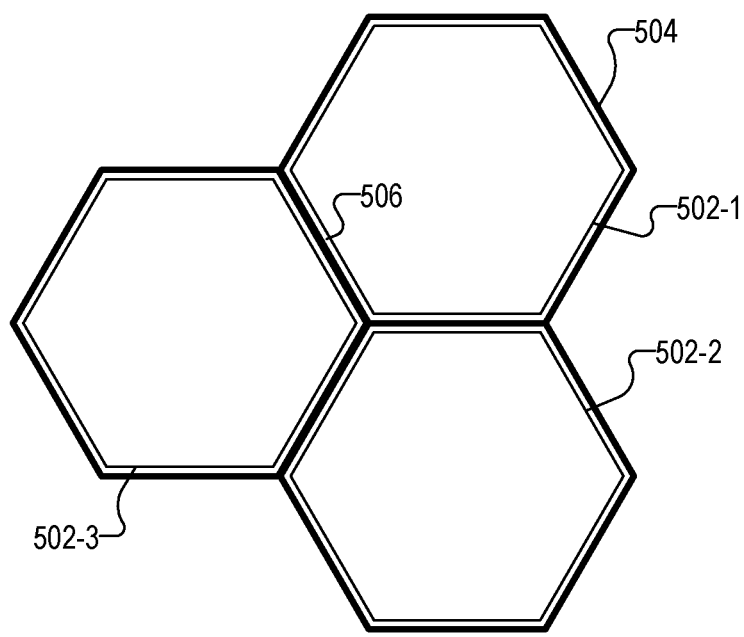
Figure 5B:
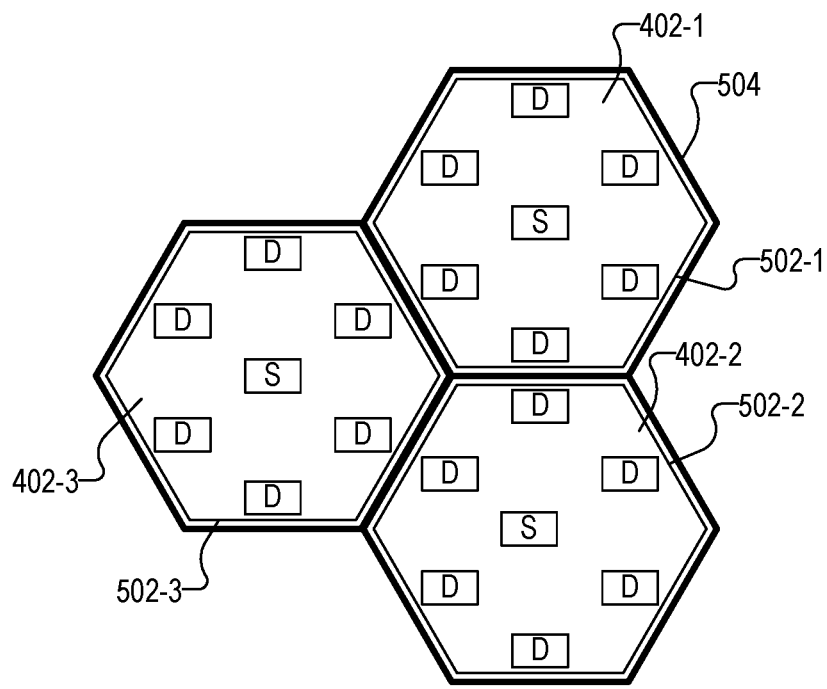

In FIG. 4, modules 402 are shown to be adjacent to and touching one another. Modules 402 may alternatively be spaced apart from one another. For example, FIGS. 5A-5B show an exemplary implementation of modular assembly 400 in which modules 402 are configured to be inserted into individual slots 502 (e.g., slots 502-1 through 502-3, also referred to as cutouts) of a wearable assembly 504. In particular, FIG. 5A shows the individual slots 502 of the wearable assembly 504 before modules 402 have been inserted into respective slots 502, and FIG. 5B shows wearable assembly 504 with individual modules 402 inserted into respective individual slots 502.

Wearable assembly 504 may implement wearable assembly 302 and may be configured as headgear and/or any other type of device configured to be worn by a user.

As shown in FIG. 5A, each slot 502 is surrounded by a wall (e.g., wall 506) such that when modules 402 are inserted into their respective individual slots 502, the walls physically separate modules 402 one from another. In alternative embodiments, a module (e.g., module 402-1) may be in at least partial physical contact with a neighboring module (e.g., module 402-2).

Each of the modules described herein may be inserted into appropriately shaped slots or cutouts of a wearable assembly, as described in connection with FIGS. 5A-5B. However, for ease of explanation, such wearable assemblies are not shown in the figures.

As shown in FIGS. 4 and 5B, modules 402 may have a hexagonal shape. Modules 402 may alternatively have any other suitable geometry (e.g., in the shape of a pentagon, octagon, square, rectangular, circular, triangular, free-form, etc.).

As another example, brain interface system 102 may be implemented by a wearable multimodal measurement system configured to perform both optical-based brain data acquisition operations and electrical-based brain data acquisition operations, such as any of the wearable multimodal measurement systems described in U.S. patent application Ser. Nos. 17/176,315 and 17/176,309, which applications have been previously incorporated herein by reference in their respective entireties.

Figure 6:
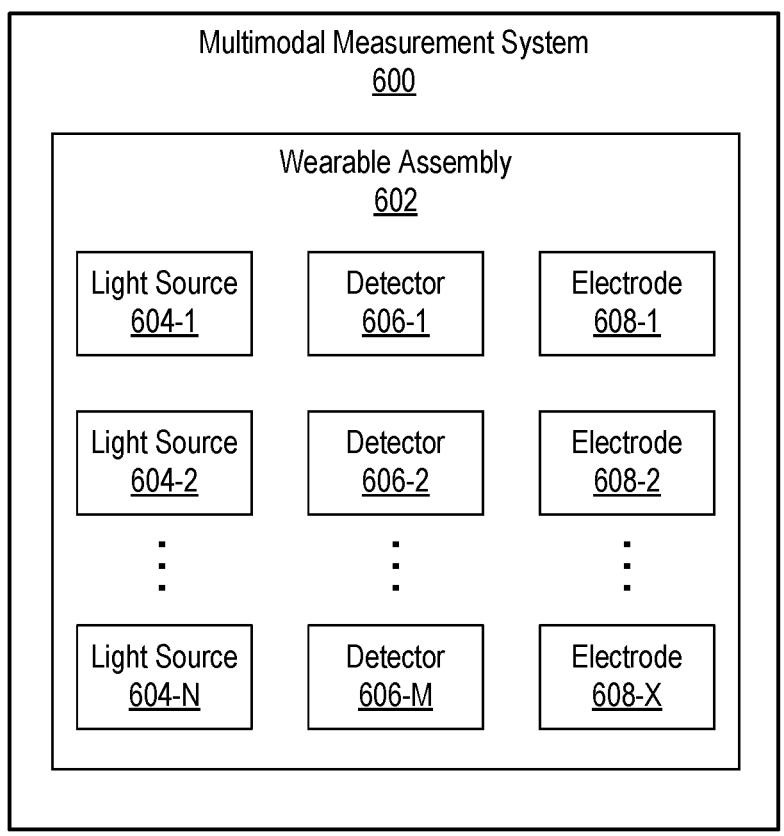
FIGS. 6-7 show various multimodal measurement systems that may implement the brain interface system of FIG. 1.
Figure 7:
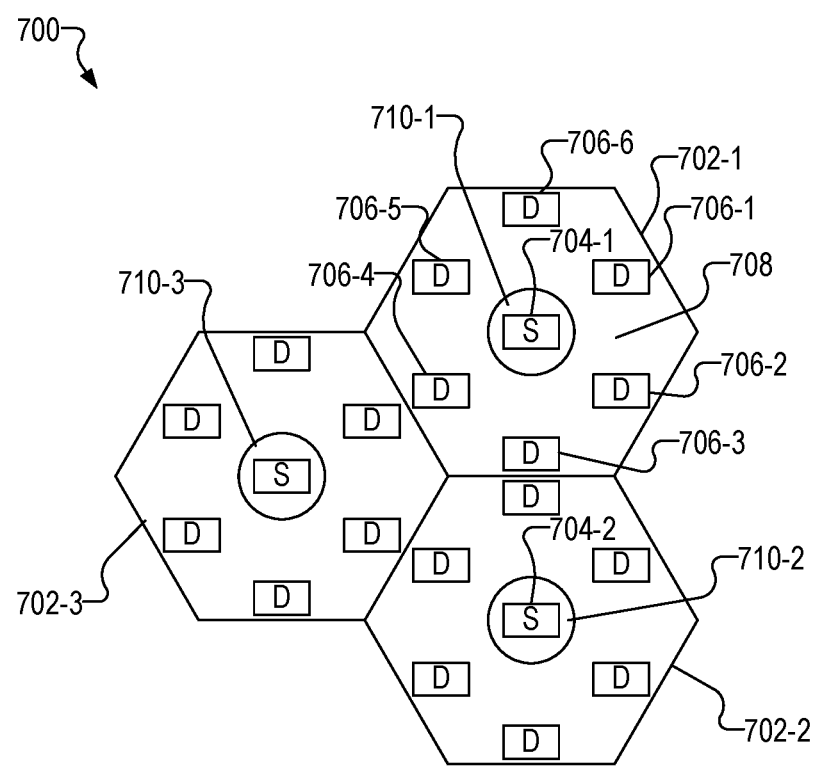

To illustrate, FIGS. 6-7 show various multimodal measurement systems that may implement brain interface system 102. The multimodal measurement systems described herein are merely illustrative of the many different multimodal-based brain interface systems that may be used in accordance with the systems and methods described herein.

FIG. 6 shows an exemplary multimodal measurement system 600 in accordance with the principles described herein. Multimodal measurement system 600 may at least partially implement optical measurement system 200 and, as shown, includes a wearable assembly 602 (which is similar to wearable assembly 302), which includes N light sources 604 (e.g., light sources 604-1 through 604-N, which are similar to light sources 304), M detectors 606 (e.g., detectors 606-1 through 606-M, which are similar to detectors 306), and X electrodes (e.g., electrodes 608-1 through 608-X). Multimodal measurement system 600 may include any of the other components of optical measurement system 200 as may serve a particular implementation. N, M, and X may each be any suitable value (i.e., there may be any number of light sources 604, any number of detectors 606, and any number of electrodes 608 included in multimodal measurement system 600 as may serve a particular implementation).

Electrodes 608 may be configured to detect electrical activity within a target (e.g., the brain). Such electrical activity may include electroencephalogram (EEG) activity and/or any other suitable type of electrical activity as may serve a particular implementation. In some examples, electrodes 608 are all conductively coupled to one another to create a single channel that may be used to detect electrical activity. Alternatively, at least one electrode included in electrodes 608 is conductively isolated from a remaining number of electrodes included in electrodes 608 to create at least two channels that may be used to detect electrical activity.

FIG. 7 shows an illustrative modular assembly 700 that may implement multimodal measurement system 600. As shown, modular assembly 700 includes a plurality of modules 702 (e.g., modules 702-1 through 702-3). While three modules 702 are shown to be included in modular assembly 700, in alternative configurations, any number of modules 702 (e.g., a single module up to sixteen or more modules) may be included in modular assembly 700. Moreover, while each module 702 has a hexagonal shape, modules 702 may alternatively have any other suitable geometry (e.g., in the shape of a pentagon, octagon, square, rectangular, circular, triangular, free-form, etc.).

Each module 702 includes a light source (e.g., light source 704-1 of module 702-1 and light source 704-2 of module 702-2) and a plurality of detectors (e.g., detectors 706-1 through 706-6 of module 702-1). In the particular implementation shown in FIG. 7, each module 702 includes a single light source and six detectors. Alternatively, each module 702 may have any other number of light sources (e.g., two light sources) and any other number of detectors. The various components of modular assembly 700 shown in FIG. 7 are similar to those described in connection with FIG. 4.

As shown, modular assembly 700 further includes a plurality of electrodes 710 (e.g., electrodes 710-1 through 710-3), which may implement electrodes 608. Electrodes 710 may be located at any suitable location that allows electrodes 710 to be in physical contact with a surface (e.g., the scalp and/or skin) of a body of a user. For example, in modular assembly 700, each electrode 710 is on a module surface configured to face a surface of a user's body when modular assembly 700 is worn by the user. To illustrate, electrode 710-1 is on surface 708 of module 702-1. Moreover, in modular assembly 700, electrodes 710 are located in a center region of each module 702 and surround each module's light source 704. Alternative locations and configurations for electrodes 710 are possible.

As another example, brain interface system 102 may be implemented by a wearable magnetic field measurement system configured to perform magnetic field-based brain data acquisition operations, such as any of the magnetic field measurement systems described in U.S. patent application Ser. No. 16/862,879, filed Apr. 30, 2020 and published as US2020/0348368A1; U.S. Provisional Application No. 63/170,892, filed Apr. 5, 2021, U.S. Non-Provisional application Ser. No. 17/338,429, filed Jun. 3, 2021, and Ethan J. Pratt, et al., "Kernel Flux: A Whole-Head 432-Magnetometer Optically-Pumped Magnetoencephalography (OP-MEG) System for Brain Activity Imaging During Natural Human Experiences," SPIE Photonics West Conference (Mar. 6, 2021), which applications and publication are incorporated herein by reference in their entirety. In some examples, any of the magnetic field measurement systems described herein may be used in a magnetically shielded environment which allows for natural user movement as described for example in U.S. Provisional Patent Application No. 63/076,015, filed Sep. 9, 2020, and U.S. Non-Provisional patent application Ser. No. 17/328,235, filed May 24, 2021, which applications are incorporated herein by reference in their entirety.

Figure 8:
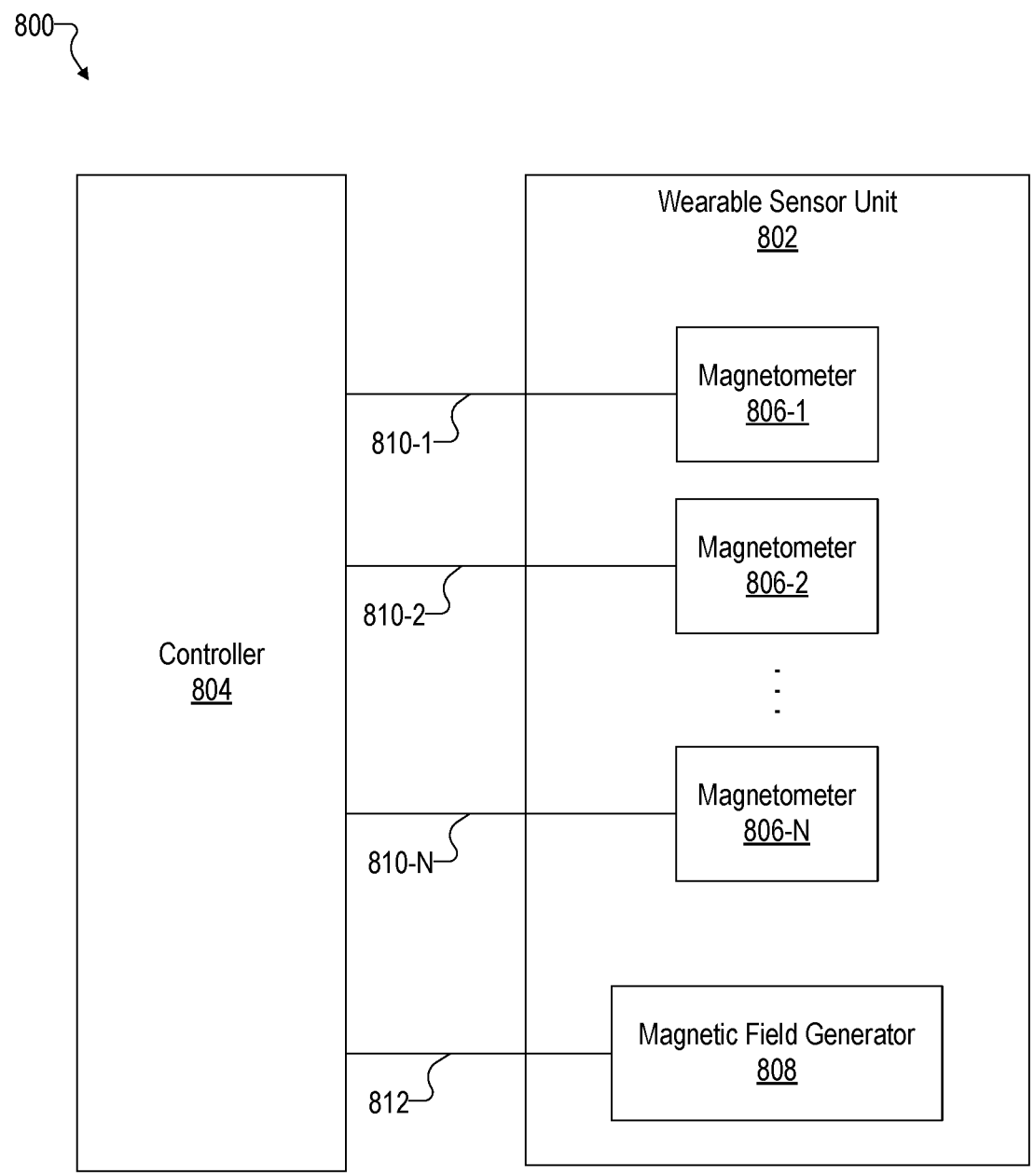
FIG. 8 shows an exemplary magnetic field measurement system that may implement the brain interface system of FIG. 1.

FIG. 8 shows an exemplary magnetic field measurement system 800 ("system 800") that may implement brain interface system 102. As shown, system 800 includes a wearable sensor unit 802 and a controller 804. Wearable sensor unit 802 includes a plurality of magnetometers 806-1 through 806-N (collectively "magnetometers 806", also referred to as optically pumped magnetometer (OPM) modular assemblies as described below) and a magnetic field generator 808. Wearable sensor unit 802 may include additional components (e.g., one or more magnetic field sensors, position sensors, orientation sensors, accelerometers, image recorders, detectors, etc.) as may serve a particular implementation. System 800 may be used in magnetoencephalography (MEG) and/or any other application that measures relatively weak magnetic fields.

Wearable sensor unit 802 is configured to be worn by a user (e.g., on a head of the user). In some examples, wearable sensor unit 802 is portable. In other words, wearable sensor unit 802 may be small and light enough to be easily carried by a user and/or worn by the user while the user moves around and/or otherwise performs daily activities, or may be worn in a magnetically shielded environment which allows for natural user movement as described more fully in U.S. Provisional Patent Application No. 63/076,015, and U.S. Non-Provisional patent application Ser. No. 17/328,235, filed May 24, 2021, previously incorporated by reference.

Any suitable number of magnetometers 806 may be included in wearable sensor unit 802. For example, wearable sensor unit 802 may include an array of nine, sixteen, twenty-five, or any other suitable plurality of magnetometers 806 as may serve a particular implementation.

Magnetometers 806 may each be implemented by any suitable combination of components configured to be sensitive enough to detect a relatively weak magnetic field (e.g., magnetic fields that come from the brain). For example, each magnetometer may include a light source, a vapor cell such as an alkali metal vapor cell (the terms "cell", "gas cell", "vapor cell", and "vapor gas cell" are used interchangeably herein), a heater for the vapor cell, and a photodetector (e.g., a signal photodiode). Examples of suitable light sources include, but are not limited to, a diode laser (such as a vertical-cavity surface-emitting laser (VCSEL), distributed Bragg reflector laser (DBR), or distributed feedback laser (DFB)), light-emitting diode (LED), lamp, or any other suitable light source. In some embodiments, the light source may include two light sources: a pump light source and a probe light source.

Magnetic field generator 808 may be implemented by one or more components configured to generate one or more compensation magnetic fields that actively shield magnetometers 806 (including respective vapor cells) from ambient background magnetic fields (e.g., the Earth's magnetic field, magnetic fields generated by nearby magnetic objects such as passing vehicles, electrical devices and/or other field generators within an environment of magnetometers 806, and/or magnetic fields generated by other external sources).

For example, magnetic field generator 808 may include one or more coils configured to generate compensation magnetic fields in the Z direction, X direction, and/or Y direction (all directions are with respect to one or more planes within which the magnetic field generator 808 is located). The compensation magnetic fields are configured to cancel out, or substantially reduce, ambient background magnetic fields in a magnetic field sensing region with minimal spatial variability.

Controller 804 is configured to interface with (e.g., control an operation of, receive signals from, etc.) magnetometers 806 and the magnetic field generator 808. Controller 804 may also interface with other components that may be included in wearable sensor unit 802.

In some examples, controller 804 is referred to herein as a "single" controller 804. This means that only one controller is used to interface with all of the components of wearable sensor unit 802. For example, controller 804 may be the only controller that interfaces with magnetometers 806 and magnetic field generator 808. It will be recognized, however, that any number of controllers may interface with components of magnetic field measurement system 800 as may suit a particular implementation.

As shown, controller 804 may be communicatively coupled to each of magnetometers 806 and magnetic field generator 808. For example, FIG. 8 shows that controller 804 is communicatively coupled to magnetometer 806-1 by way of communication link 810-1, to magnetometer 806-2 by way of communication link 810-2, to magnetometer 806-N by way of communication link 810-N, and to magnetic field generator 808 by way of communication link 812. In this configuration, controller 804 may interface with magnetometers 806 by way of communication links 810-1 through 810-N (collectively "communication links 810") and with magnetic field generator 808 by way of communication link 812.

Communication links 810 and communication link 812 may be implemented by any suitable wired connection as may serve a particular implementation. For example, communication links 810 may be implemented by one or more twisted pair cables while communication link 812 may be implemented by one or more coaxial cables. Alternatively, communication links 810 and communication link 812 may both be implemented by one or more twisted pair cables. In some examples, the twisted pair cables may be unshielded.

Controller 804 may be implemented in any suitable manner. For example, controller 804 may be implemented by a field-programmable gate array (FPGA), an application specific integrated circuit (ASIC), a digital signal processor (DSP), a microcontroller, and/or other suitable circuit together with various control circuitry.

In some examples, controller 804 is implemented on one or more printed circuit boards (PCBs) included in a single housing. In cases where controller 804 is implemented on a PCB, the PCB may include various connection interfaces configured to facilitate communication links 810 and 812. For example, the PCB may include one or more twisted pair cable connection interfaces to which one or more twisted pair cables may be connected (e.g., plugged into) and/or one or more coaxial cable connection interfaces to which one or more coaxial cables may be connected (e.g., plugged into).

In some examples, controller 804 may be implemented by or within a computing device.

In some examples, a wearable magnetic field measurement system may include a plurality of optically pumped magnetometer (OPM) modular assemblies, which OPM modular assemblies are enclosed within a housing sized to fit into a headgear (e.g., brain interface system 102) for placement on a head of a user (e.g., human subject). The OPM modular assembly is designed to enclose the elements of the OPM optics, vapor cell, and detectors in a compact arrangement that can be positioned close to the head of the human subject. The headgear may include an adjustment mechanism used for adjusting the headgear to conform with the human subject's head. These exemplary OPM modular assemblies and systems are described in more detail in U.S. Provisional Patent Application No. 63/170,892, previously incorporated by reference in its entirety.

At least some of the elements of the OPM modular assemblies, systems which can employ the OPM modular assemblies, and methods of making and using the OPM modular assemblies have been disclosed in U.S. Patent Application Publications Nos. 2020/0072916; 2020/0056263; 2020/0025844; 2020/0057116; 2019/0391213; 2020/0088811; 2020/0057115; 2020/0109481; 2020/0123416; 2020/0191883; 2020/0241094; 2020/0256929; 2020/0309873; 2020/0334559; 2020/0341081; 2020/0381128; 2020/0400763; and 2021/0011094; U.S. patent application Ser. Nos. 16/928,810; 16/984,720; 16/984,752; 17/004,507; and 17/087,988, and U.S. Provisional Patent Applications Ser. Nos. 62/689,696; 62/699,596; 62/719,471; 62/719,475; 62/719,928; 62/723,933; 62/732,327; 62/732,791; 62/741,777; 62/743,343; 62/747,924; 62/745,144; 62/752,067; 62/776,895; 62/781,418; 62/796,958; 62/798,209; 62/798,330; 62/804,539; 62/826,045; 62/827,390; 62/836,421; 62/837,574; 62/837,587; 62/842,818; 62/855,820; 62/858,636; 62/860,001; 62/865,049; 62/873,694; 62/874,887; 62/883,399; 62/883,406; 62/888,858; 62/895,197; 62/896,929; 62/898,461; 62/910,248; 62/913,000; 62/926,032; 62/926,043; 62/933,085; 62/960,548; 62/971,132; 63/031,469; 63/052,327; 63/076,015; 63/076,880; 63/080,248; 63/135,364; 63/136,415; and 63/170,892, all of which are incorporated herein by reference in their entireties.

In some examples, one or more components of brain interface system 102 (e.g., one or more computing devices) may be configured to be located off the head of the user.

Extended reality system 104 (FIG. 1 and FIG. 9) may be implemented by any suitable system configured to worn by a user and provide the user with an extended reality experience. As used herein, extended reality system 104 may provide a user with an extended reality experience by providing an immersive virtual reality experience, a non-immersive augmented reality experience, and/or any combination of these types of experiences.

While providing an extended reality experience to a user, extended reality system 104 may present extended reality content to the user. Extended reality content may refer to virtual reality content and/or augmented reality content. Virtual reality content may be completely immersible such that no real-world content is visually presented to the user while the virtual reality content is presented to the user. Augmented reality content adds digital elements to a live view of the user.

Figure 9:
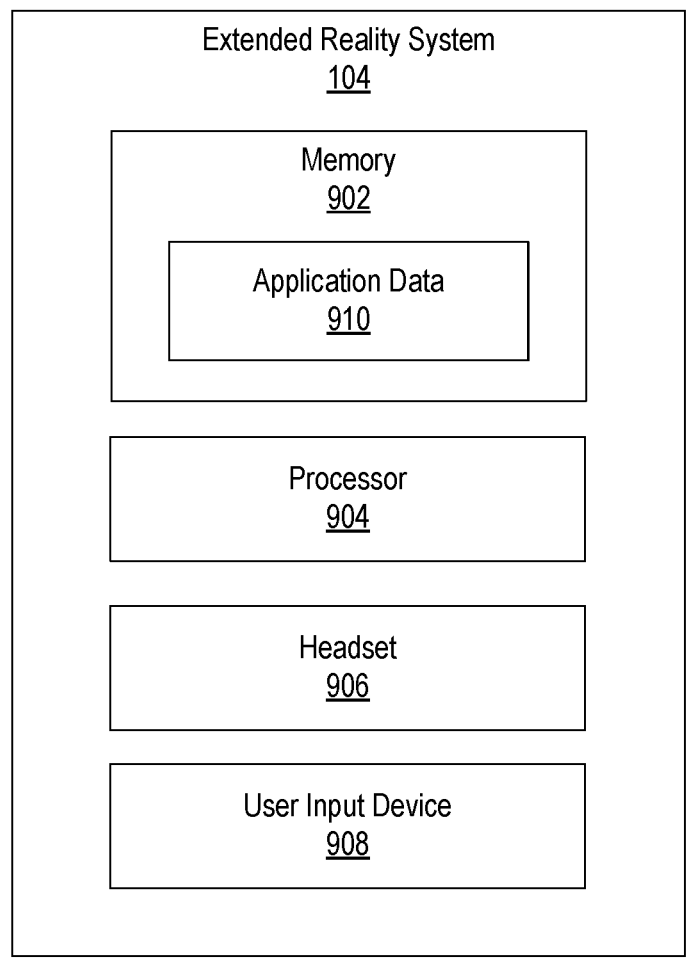
FIG. 9 shows exemplary components of extended reality system.

FIG. 9 shows exemplary components of extended reality system 104. As shown, extended reality system 104 may include memory 902, a processor 904, a headset 906, and a user input device 908. Extended reality system 104 may include additional or alternative components as may serve a particular implementation. Each component may be implemented by any suitable combination of hardware and/or software.

Memory 902 may be configured to maintain application data 910 representative of one or more applications that may be executed by processor 904. In some examples, an application represented by application data 910 may be configured to cause extended reality system 104 to present audio and/or visual stimuli to the user as part of a neuroscience analysis study or experiment. For example, the audio and/or visual stimuli may be configured to produce robust hemodynamic responses within the brain of a user.

Processor 904 may be configured to perform various operations associated with presenting extended reality content to the user and detecting various events while the user experiences the extended reality content. For example, processor 904 may track a user's eyes while the user experiences the extended reality content, detect user input provided by the user by way of user input device 908, and log events (e.g., by generating timestamp data indicating when certain types of user input are provided by the user and/or when the user performs various actions).

Headset 906 may be implemented by one or more head-mounted display screens and/or other components configured to be worn on the head (e.g., such that the display screens are viewable by the user).

User input device 908 may be implemented by one or more components configured to facilitate user input by the user while the user experiences the extended reality content. For example, user input device 908 may be implemented by one or more joysticks, buttons, and/or other mechanical implementations. Additionally or alternatively, user input device 908 may be implemented by gaze tracking hardware and/or software configured to detect user input provided by a gaze of the user (e.g., by the user fixating his or her view on a particular option presented within the extended reality content). Additionally or alternatively, user input device 908 may be implemented by any other combination of hardware and/or software as may serve a particular implementation.

Returning to FIG. 1, communication link 106 may be implemented by any suitable wired and/or wireless link configured to facilitate transfer of data and/or signals between brain interface system 102 and extended reality system 104. Such communication may include transmission of commands from brain interface system 102 to extended reality system 104, transmission of synchronization data from extended reality system 104 to brain interface system 102, and/or any other transmission of data and/or signals between brain interface system 102 and extended reality system 104.

In some examples, communication link 106 is bidirectional, as shown in FIG. 1. In other examples, communication link 106 is unidirectional. For example, communication link 106 may only allow one or more signals to be transmitted from extended reality system 104 to brain interface system 102.

To illustrate, communication link 106 may be implemented by an output audio port included within extended reality system 104. In this configuration, extended reality system 104 may output an audio signal by way of the output audio port, which may be transmitted to brain interfaced system 102 by way of a cable, for example, that plugs into the output audio port.

Figure 10:
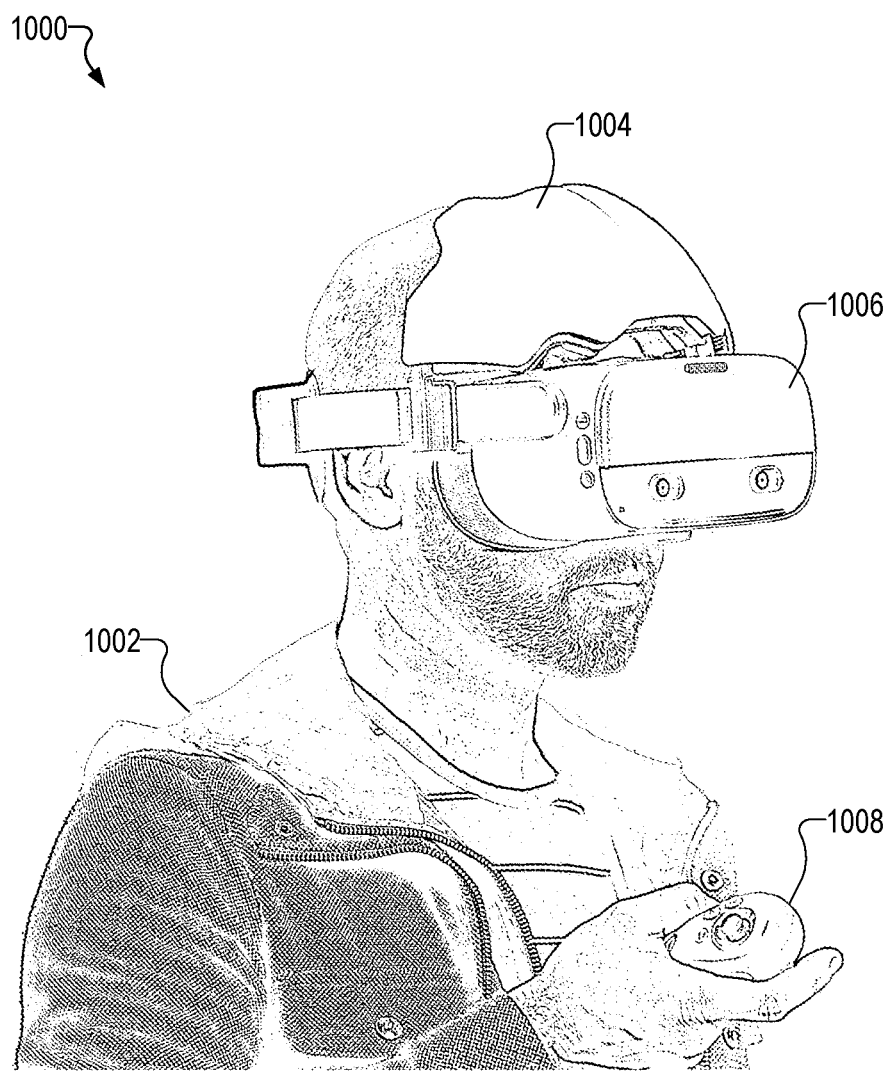
FIG. 10 show an exemplary implementation of the wearable extended reality-based neuroscience analysis system of FIG. 1 in use by a user.

FIG. 10 show an exemplary implementation 1000 of system 100 (FIG. 1) in use by a user 1002. As shown, user 1002 is wearing a headgear 1004 that implements brain interface system 102 and a headset 1006 that implements extended reality system 104. In implementation 1000, headset 1006 is a virtual reality headset that provides an immersive virtual reality experience for user 1002. As shown, user 1002 is holding a joystick 1008 that implements user input device 908 (FIG. 9).

Figure 11:
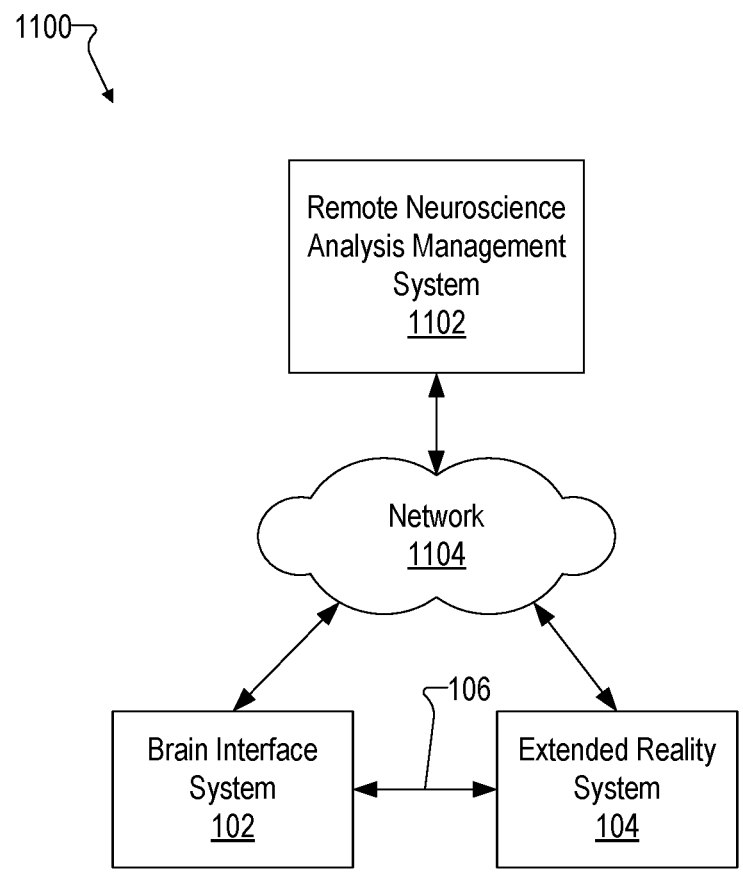
FIG. 11 shows an exemplary configuration in which a remote neuroscience analysis management system may be used to remotely control a neuroscience experiment performed using the wearable extended reality-based neuroscience analysis system of FIG. 1.

FIG. 11 shows an exemplary configuration 1100 in which a remote neuroscience analysis management system 1102 ("system 1102") may be used to remotely control a neuroscience experiment performed using brain interface system 102 and extended reality system 104. Configuration 1100 may be used to remotely control a neuroscience experiment performed on multiple users located in different locations (e.g., in their homes, in their classroom, in separate laboratories, in laboratories located in various locations, etc.). In some examples, configuration 1100 may also be used by subjects/patients who normally cannot be confined in a hospital environment due to limiting health or mobility concerns.

As shown, system 1102 is connected to brain interface system 102 and extended reality system 104 by way of a network 1104 (e.g., the Internet or any other suitable network). Alternatively, system 1102 may be connected to only one of brain interface system 102 or extended reality system 104.

System 1102 may be used to remotely control a neuroscience experiment performed using brain interface system 102 and extended reality system 104. For example, system 1102 may transmit experiment data to brain interface system 102 and/or extended reality system 104, where the experiment data is representative of a particular experiment that is to be performed using brain interface system 102 and extended reality system 104. System 1102 may be further configured to receive results data from brain interface system 102 and/or extended reality system 104, where the results data is representative of one or more results of the particular experiment.

To illustrate, system 1102 (or any other system configured to control brain interface system 102 and extended reality system 104) may be configured to transmit a first command to extended reality system 104 for extended reality system 104 to provide the user with an extended reality experience. System 1102 may be further configured to transmit a second command to brain interface system 102 for brain interface system 102 to acquire one or more brain activity measurements while the extended reality experience is being provided to the user. System 1102 may be further configured to receive, from brain interface system 102, measurement data representative of the one or more brain activity measurements and perform an operation based on the measurement data. The operation may be any of the operations described herein.

In some examples, it may be desirable to synchronize brain activity measurements acquired by brain interface system 102 with events that occur within the extended reality experience provided to the user by extended reality system 104 (referred to herein as extended reality events). However, in some configurations, brain interface system 102 does not have access to an internal clock used by extended reality system 104. For example, in an off-the-shelf implementation of extended reality system 104 (i.e., an implementation that is not specifically customized to integrate with brain interface system 102), extended reality system 104 may not be configured to output an externally-available clock signal.

However, extended reality system 104 may, in some examples, be configured to output one or more signals that are not representative of an internal clock used by extended reality system 104. For example, extended reality system 104 may be configured to output (by way of a wired communication link and/or a wireless communication link) an audio signal representative of audio used in or otherwise associated with an extended reality experience being provided to a user. This audio signal may be output, for example, by way of an output audio port included in extended reality system 104. Additionally or alternatively, extended reality system 104 may be configured to output an electrical signal, an optical signal, and/or any other type of signal that may be accessed by components external to extended reality system 104. In any of these configurations, brain interface system 102 may be configured to access the signal and use the signal to generate and output data that may be temporally synchronized with data output by extended reality system 104. Because the signal may be used for synchronization purposes, it will be referred to herein generally as a "timing signal."

Figure 12:
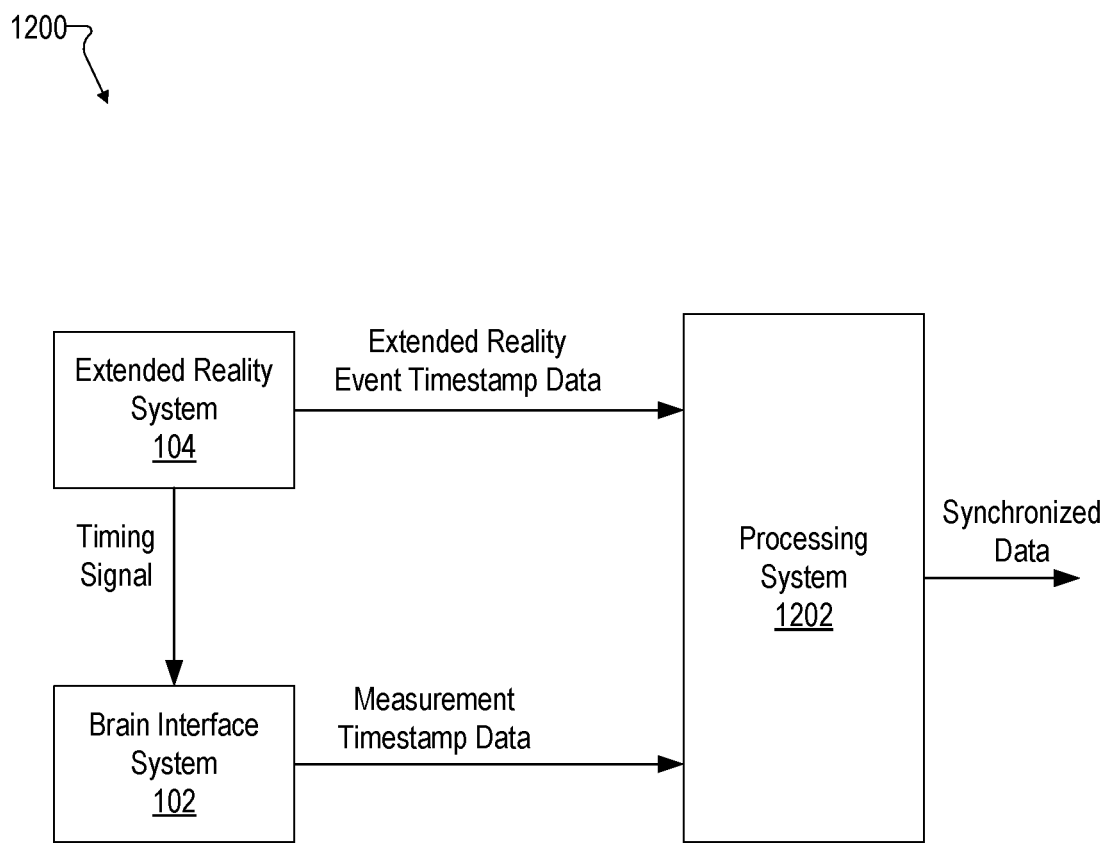
FIG. 12 shows an exemplary configuration in which an extended reality system is configured to output a timing signal that may be used to synchronize data output by the extended reality system and data output by a brain interface system.

To illustrate, FIG. 12 shows an exemplary configuration 1200 in which extended reality system 104 is configured to output a timing signal that may be used to synchronize data output by extended reality system 104 and data output by brain interface system 102. In configuration 1200, the timing signal may be an audio signal, an optical signal, an electrical signal, and/or any other type of signal that may be used for synchronization purposes.

For illustrative purposes, it will be assumed herein that the timing signal output by extended reality system 104 is an audio signal. The audio signal may be audible or inaudible to the user as may serve a particular implementation. An inaudible timing signal, for example, may be in a frequency band that is not in the user's range of hearing.

In some example, characteristics of the audio signal may be specified by application data 910, and may therefore be adjusted or otherwise programmed as needed by an external entity (e.g., remote neuroscience analysis management system 1102). For example, a characteristic of the audio signal may be configured to modulate between two states or values such that the audio signal represents a plurality of timing events that occur during the extended reality experience that is provided to the user.

Figure 13:
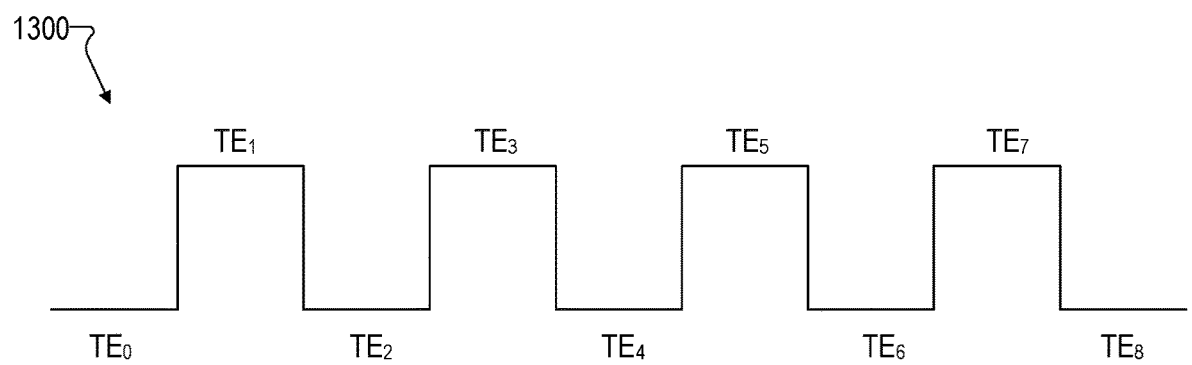
FIG. 13 shows an exemplary timing signal that may be output by an extended reality system.

To illustrate, FIG. 13 shows an exemplary timing signal 1300 that may be output by extended reality system 104. As shown, timing signal 1300 is configured to periodically change between a low level and a high level. Each change indicates a beginning of a new timing event. For example, as shown, timing signal 1300 may initially be at a low level, which corresponds to a timing event labeled $TE_0$. Timing signal 1300 then changes to a high level, at which point a new timing event labeled $TE_1$ begins. Timing signal 1300 continues to modulate between the low and high levels to create timing events $TE_2$ through $TE_8$.

The levels shown in FIG. 13 may be representative of any characteristic of timing signal 1300. For example, the levels shown in FIG. 13 may be volume levels (e.g., first and second volume levels). Other characteristics (e.g., frequency, amplitude, etc.) of the timing signal 1300 may be modulated to indicate timing events as may serve a particular implementation.

The timing signal output by extended reality system 104 may be analog or digital as may serve a particular implementation. For example, if the timing signal is an analog audio signal, the audio signal may be output by way of an output audio port and transmitted to brain interface system 102 by way of a cable that is plugged into the output audio port. Brain interface system 102 may include a digitizer (e.g., an analog-to-digital converter) configured to convert the analog audio signal into a digital audio signal that switches between different values.

By providing the timing signal from extended reality system 104 to brain interface system 102, both extended reality system 104 and brain interface system 102 may have access to a signal that coveys the same timing information. As such, brain interface system 102 and extended reality system 104 may both use the same timing information to output different types of timestamp data.

To illustrate, as shown in FIG. 12, brain interface system 102 may acquire brain activity measurements while the extended reality experience is being provided to the user and output measurement timestamp data representative of a temporal association of the brain activity measurements with the timing events represented by the timing signal. For example, brain interface system 102 may determine that a particular brain activity measurement is acquired during a particular timing event represented by the timing signal and include, in the measurement timestamp data, data indicating that the particular brain activity measurement is acquired during the particular timing event.

Likewise, as shown in FIG. 12, extended reality system 104 may output extended reality event timestamp data representative of a temporal association of extended reality events with the timing events. For example, extended reality system 104 may determine that a particular extended reality event occurs during a particular timing event represented by the timing signal and include, in the extended reality event timestamp data, data indicating that the particular extended reality event occurs during the particular timing event.

As used herein, an "extended reality event" may include a user input event provided by the user (e.g., a user input received by way of user input device 908), an occurrence a visual event within the extended reality experience (e.g., a display of a particular object within the extended reality experience), an occurrence of an audio event within the extended reality experience (e.g., a playing of a particular sound within the extended reality experience), and/or any other event associated with the extended reality experience.

As both the measurement timestamp data and the extended reality event timestamp data are generated using the same timing signal, they may be synchronized in any suitable manner. For example, as shown in FIG. 12, a processing system 1202 may be configured to receive both the measurement timestamp data and the extended reality event timestamp data and output, based on both datasets, synchronized data. The synchronized data may represent a time-synchronized version of the measurement timestamp data and the extended reality event timestamp data. Such synchronization may be performed in any suitable manner, such as by determining a timing offset that may need to be applied to the measurement timestamp data such that it is correlated properly with the extended reality event timestamp data.

Figure 14:
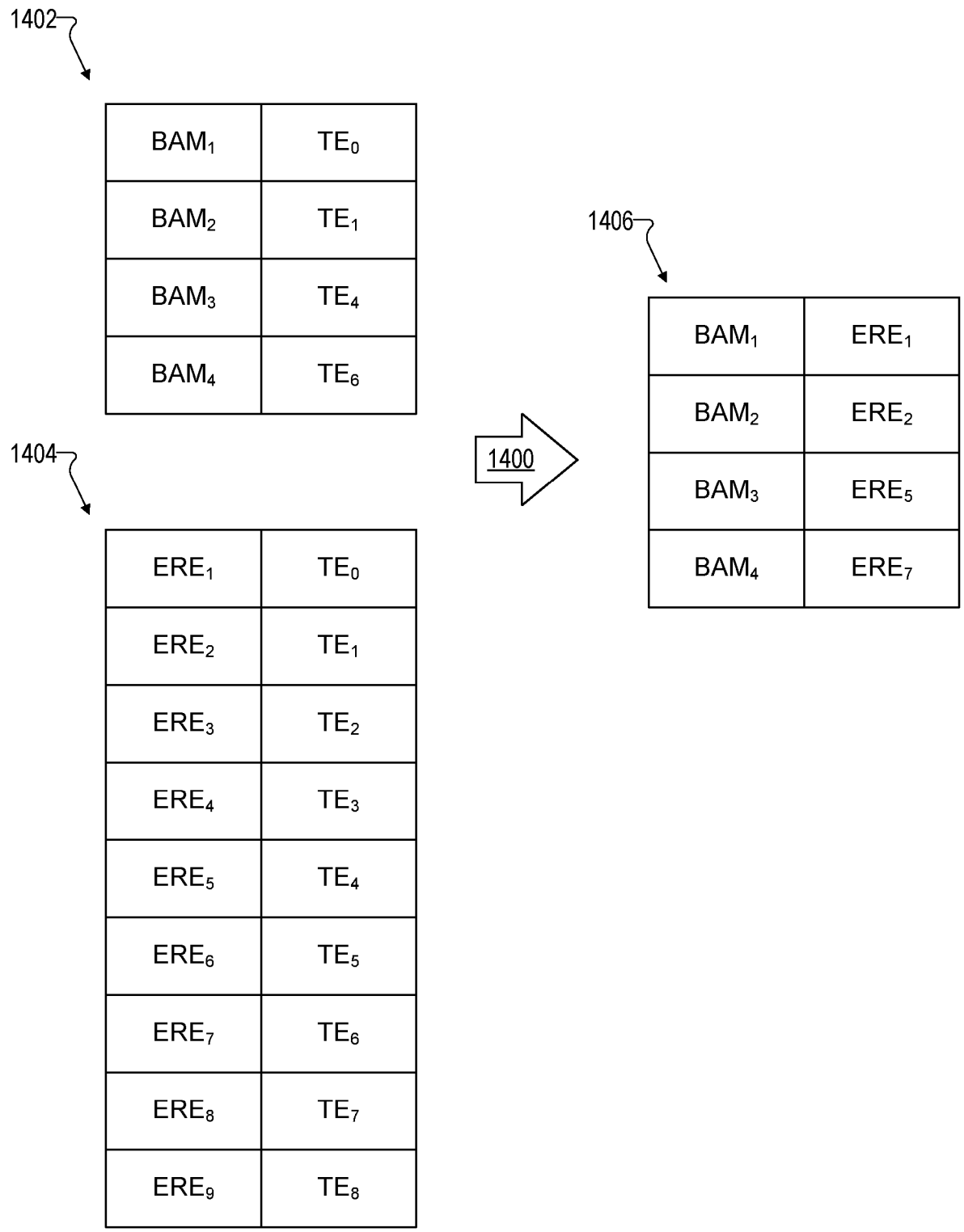
FIG. 14 shows an exemplary synchronization process that may be performed by a processing system.

FIG. 14 shows an exemplary synchronization process performed by processing system 1202. The synchronization process is represented in FIG. 14 by arrow 1400.

In FIG. 14, table 1402 represents measurement timestamp data generated by brain interface system 102. As shown, the measurement timestamp data includes data representative of a plurality of brain activity measurements ($BAM_1$ through $BAM_4$) and an indication as to when each brain activity measurement is acquired with respect to the timing events of timing signal 1300. For example, table 1402 shows that brain activity measurement $BAM_1$ is acquired during timing event $TE_0$, brain activity measurement $BAM_2$ is acquired during timing event $TE_1$, brain activity measurement $BAM_3$ is acquired during timing event $TE_4$, and brain activity measurement $BAM_4$ is acquired during timing event $TE_6$.

Table 1404 represents extended reality event timestamp data generated by extended reality system 104. As shown, the extended reality event timestamp data includes data representative of a plurality of extended reality events ($ERE_1$ through $ERE_9$) an indication as to when each extended reality event occurs with respect to the timing events of timing signal 1300. For example, table 1404 shows that extended reality event $ERE_1$ occurs during timing event $TE_0$, extended reality event $ERE_2$ occurs during timing event $TE_1$, etc.

Processing system 1202 may synchronize the measurement timestamp data with the extended reality event timestamp data by generating synchronized data, which is represented in FIG. 14 by table 1406. As shown, the synchronized data may represent a temporal correlation between the brain activity measurements represented by the measurement timestamp data and the extended reality events represented by the extended reality event timestamp data. For example, table 1406 shows that brain activity measurement $BAM_1$ is temporally correlated with extended reality event $ERE_1$, brain activity measurement $BAM_2$ is temporally correlated with extended reality event $ERE_2$, brain activity measurement $BAM_3$ is temporally correlated with extended reality event $ERE_5$, and brain activity measurement $BAM_4$ is temporally correlated with extended reality event $ERE_7$. As mentioned, in some examples, a temporal offset (e.g., one or more timing events) may, in some examples, be applied to the measurement timestamp data and/or the extended reality event timestamp data as may serve a particular implementation to ensure that the brain activity measurements are properly correlated with the extended reality events.

In some examples, processing system 1202 may synchronize the measurement timestamp data and the extended reality event timestamp data in substantially real time while the extended reality experience is being provided to the user. Additionally or alternatively, processing system 1202 may synchronize the measurement timestamp data and the extended reality event timestamp data offline (e.g., after the extended reality experience has concluded).

Processing system 1202 may be implemented by any suitable combination of one or more computing devices. Processing system 1202 may be separate from brain interface system 102 and extended reality system 104, as shown in FIG. 12. Alternatively, processing system 1202 may be included in brain interface system 102 or extended reality system 104.

In some examples, processing system 1202 may be configured to perform an operation based on the synchronized data. For example, processing system 1202 may present graphical content showing different regions of the brain that are activated in response to an occurrence of various extended reality events, process the synchronized data to output neuroscience experimental results, provide one or more recommendations for the user, control the extended reality experience that is being provided to the user, etc.

Figure 15:
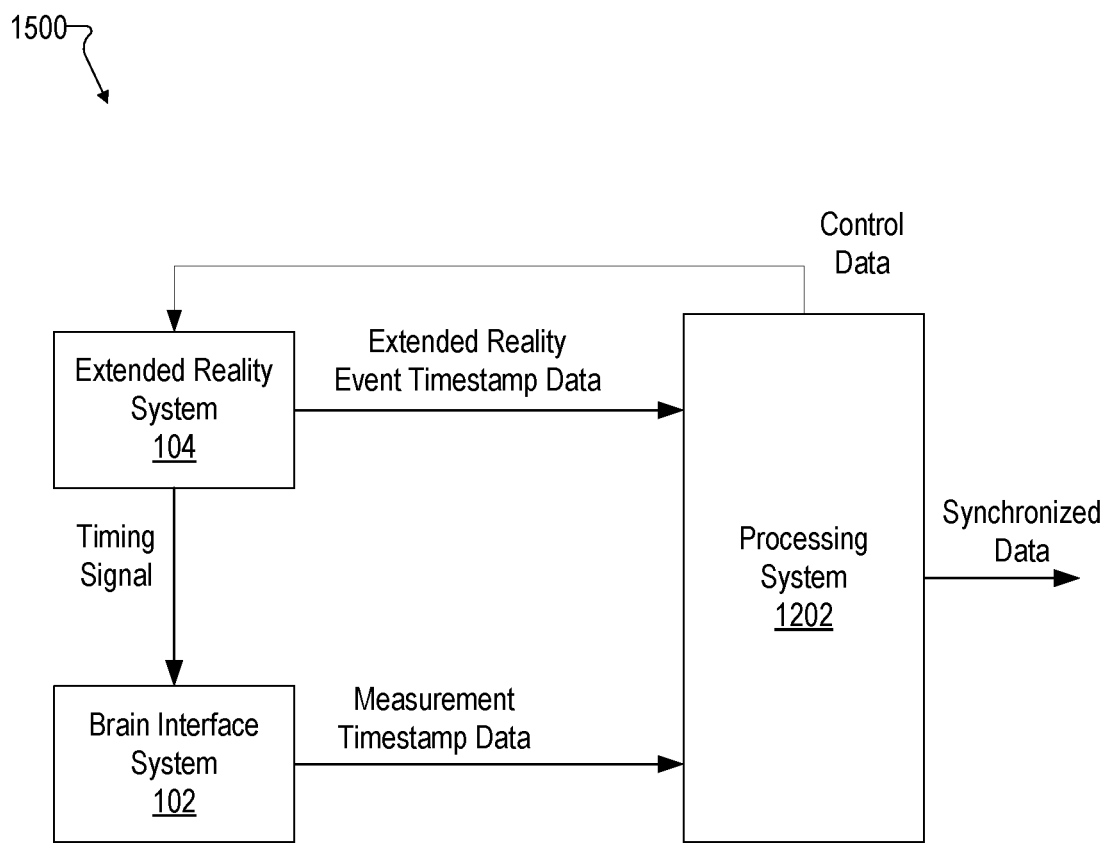
FIG. 15 shows an exemplary configuration in which a processing system is configured to control a parameter of an extended reality experience that is being provided by an extended reality system.

To illustrate, FIG. 15 shows an exemplary configuration 1500 in which processing system 1202 is configured to control a parameter of the extended reality experience that is being provided by extended reality system 104 based on the measurement timestamp data (and/or the synchronized data). As shown, processing system 1202 may control the parameter of the extended reality experience by transmitting control data to extended reality system 104. The control data is configured to control the parameter of the extended reality experience in any suitable manner. For example, the control data may cause a particular visual and/or audio cue to be provided to the user, adjust a difficulty level of a task that is to be performed within the extended reality experience, and/or otherwise adjust the extended reality experience.

Configuration 1500 may be used, for example, in a training and/or learning environment. For example, extended reality system 104 may present an extended reality experience to the user in which the user is to be taught how to perform a particular task. As the user is provided instructions related to the task within the extended reality experience, brain interface system 102 is configured to acquire brain activity measurements. Such brain activity measurements may, in some examples, be time-synchronized with events that occur within the extended reality experience, as described herein.

Processing system 1202 may be configured to use the brain activity measurements to monitor a brain state of the user during the extended reality experience. The brain state may indicate whether the user is sufficiently understanding the instructions, be indicative of a mood and/or fatigue level of the user, and/or be indicative of any other brain-related characteristic of the user.

Based on the brain state, processing system 1202 may generate control data configured to adjust one or more parameters of the extended reality experience. For example, if the brain state indicates that the user is easily understanding the instructions, the control data may be configured to cause additional instructions to be presented within the extended reality experience. Alternatively, if the brain state indicates that the user is having difficulty understanding the instructions, the control data may be configured to cause the same instructions to be repeated and/or explained in a different manner.

In some examples, data representative of and/or associated with neuroscience experiments may be distributed through a centralized platform (e.g., an app store). For example, a study designer may upload an app that users can download and use to either contribute to a larger study (e.g., a distributed neuroscience experiment) or to use to gain some insight about themselves (e.g., a cognition training app).

In some examples, the configurations described herein may provide delivery of insights based on the extended reality environment. For example, brain activity may be visualized in 3D and presented during and/or after the extended reality experience. The visualization could be an interactive and/or exploratory interface for looking at different angles of a 3D brain or zooming in on particular regions of interest. It could also show overlays of some kind of condensed score based on neural activity that shows what a user's brain was doing while the user was interacting in the extended reality experience.

In some examples, the configurations described herein may facilitate a first user viewing a second user's brain activity in virtual reality while the second person is wearing a brain interface system. For example, a medical professional may desire to see real-time responses of a patient's brain activity. The medical professional may accordingly wear the extended reality system while the patient wears the brain interface system. The medical professional may thereby see brain activation within the patient. This configuration could also be used in other situations. For example, two users could both wear a combination of a brain interface system with an extended reality system. Information about the users' brain as determined by the brain interface systems could be shared (e.g., in real-time) between the extended reality systems being worn by the two users such that the two users are aware of what is going on in each other's brains while they talk or otherwise interact.

In some examples, adaptation of an extended reality experience based on brain state may be performed in real-time and/or offline (e.g., for developer tuning of the extended reality experience). Such adaption could be based on the detected brain activity of the user. The measured brain activity could be related to physiological brain states and/or mental brain states, e.g., joy, excitement, relaxation, surprise, fear, stress, anxiety, sadness, anger, disgust, contempt, contentment, calmness, approval, focus, attention, creativity, cognitive assessment, positive or negative reflections/attitude on experiences or the use of objects, etc. Further details on the methods and systems related to a predicted brain state, behavior, preferences, or attitude of the user, and the creation, training, and use of neuromes can be found in U.S. patent application Ser. No. 17/188,298, filed Mar. 1, 2021. Exemplary measurement systems and methods using biofeedback for awareness and modulation of mental state are described in more detail in U.S. patent application Ser. No. 16/364,338, filed Mar. 26, 2019, issued as U.S. Pat. No. 11,006,876. Exemplary measurement systems and methods used for detecting and modulating the mental state of a user using entertainment selections, e.g., music, film/video, are described in more detail in U.S. patent application Ser. No. 16/835,972, filed Mar. 31, 2020, issued as U.S. Pat. No. 11,006,878. Exemplary measurement systems and methods used for detecting and modulating the mental state of a user using product formulation from, e.g., beverages, food, selective food/drink ingredients, fragrances, and assessment based on product-elicited brain state measurements are described in more detail in U.S. patent application Ser. No. 16/853,614, filed Apr. 20, 2020, published as US2020/0337624A1. Exemplary measurement systems and methods used for detecting and modulating the mental state of a user through awareness of priming effects are described in more detail in U.S. patent application Ser. No. 16/885,596, filed May 28, 2020, published as US2020/0390358A1. These applications and corresponding U.S. publications are incorporated herein by reference in their entirety.

In some examples, a common platform may be used to effectuate various neuroscience experiments. For example, a model may include a standard brain imaging device used in the various experiments (e.g., an optical measurement system as described herein). The extended reality systems described herein may provide a controlled environment and standardized platform for providing stimuli used in the experiments. In some examples, the platform may allow various entities to contribute task "apps" to a public database that anyone can access. Any apps in the public repository would be tagged according to standard event configurations and may be used to contribute to larger studies. Any entity may analyze data that is voluntarily provided by participants/users of the standard brain imaging device. Insights may be generated combining the data collected from users that participated in the public repository experiments and other data sources (e.g., sleep trackers, health and fitness trackers, etc.).

Figure 16:
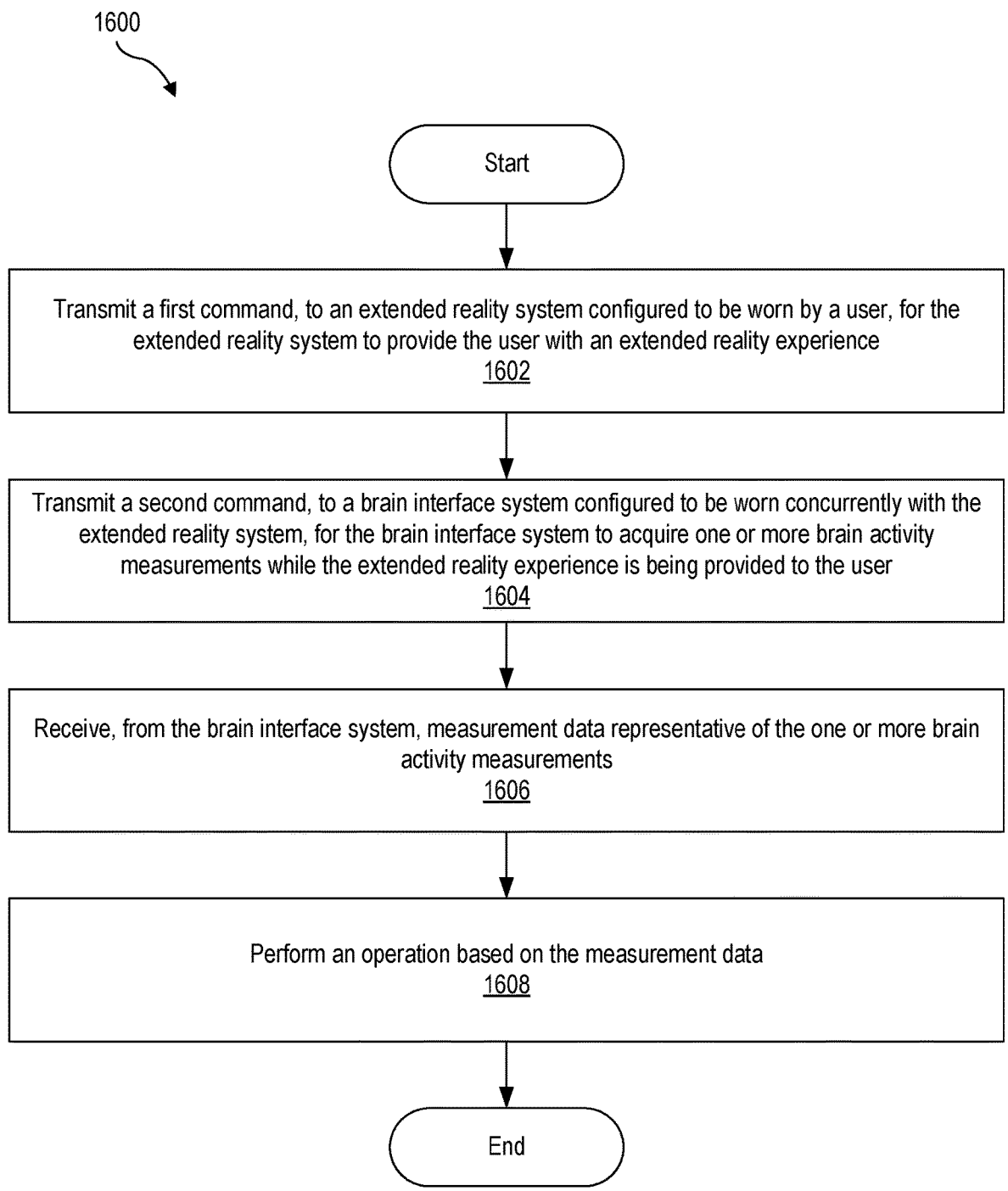
FIGS. 16-18 show various methods.

FIG. 16 illustrates an exemplary method 1600 that may be performed by a computing device (e.g., a computing device included in remote neuroscience analysis management system 1102). While FIG. 16 illustrates exemplary operations according to one embodiment, other embodiments may omit, add to, reorder, and/or modify any of the operations shown in FIG. 16. The operations shown in FIG. 16 may be performed in any of the ways described herein.

At operation 1602, a computing device transmits a first command, to an extended reality system configured to be worn by a user, for the extended reality system to provide the user with an extended reality experience.

At operation 1604, the computing device transmits a second command, to a brain interface system configured to be worn concurrently with the extended reality system, for the brain interface system to acquire one or more brain activity measurements while the extended reality experience is being provided to the user.

At operation 1606, the computing device receives, from the brain interface system, measurement data representative of the one or more brain activity measurements.

At operation 1608, the computing device performs an operation based on the measurement data. The operation may include, for example, analyzing the data based on an experiment's objective, e.g., assessment of a user's cognitive performance, assessment of a user's positive or negative reflections/attitude on experiences or the use of objects, assessment of a user's positive or negative reflections/attitude on experiences with food, beverages, drugs, music, sounds, video, etc.

Figure 17:
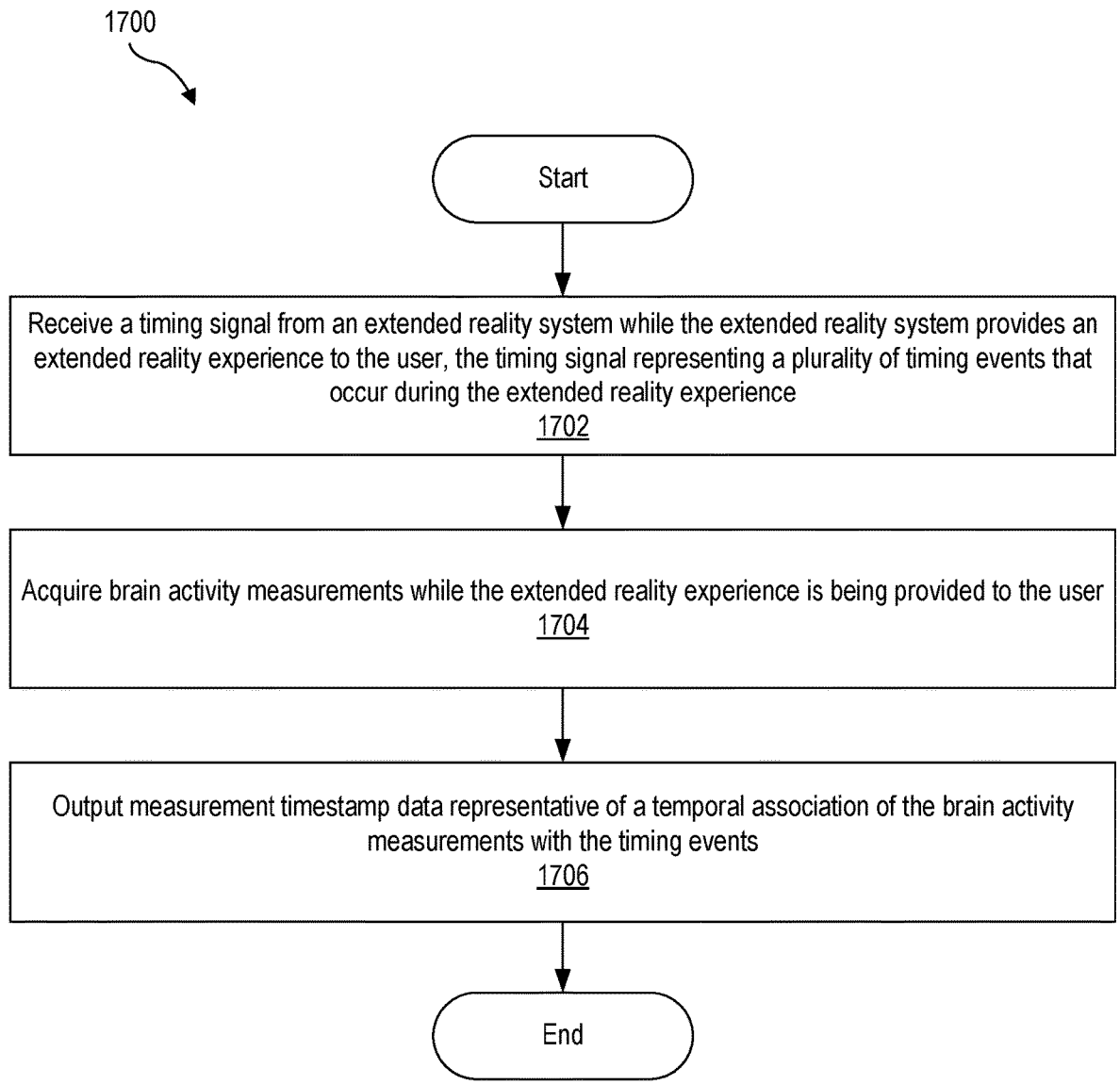

FIG. 17 illustrates an exemplary method 1700 that may be performed by any of the brain interface systems described herein. While FIG. 17 illustrates exemplary operations according to one embodiment, other embodiments may omit, add to, reorder, and/or modify any of the operations shown in FIG. 17. The operations shown in FIG. 17 may be performed in any of the ways described herein.

At operation 1702, a brain interface system receives a timing signal from an extended reality system while the extended reality system provides an extended reality experience to the user, the timing signal representing a plurality of timing events that occur during the extended reality experience.

At operation 1704, the brain interface system acquires brain activity measurements while the extended reality experience is being provided to the user.

At operation 1706, the brain interface system outputs measurement timestamp data representative of a temporal association of the brain activity measurements with the timing events.

Figure 18:
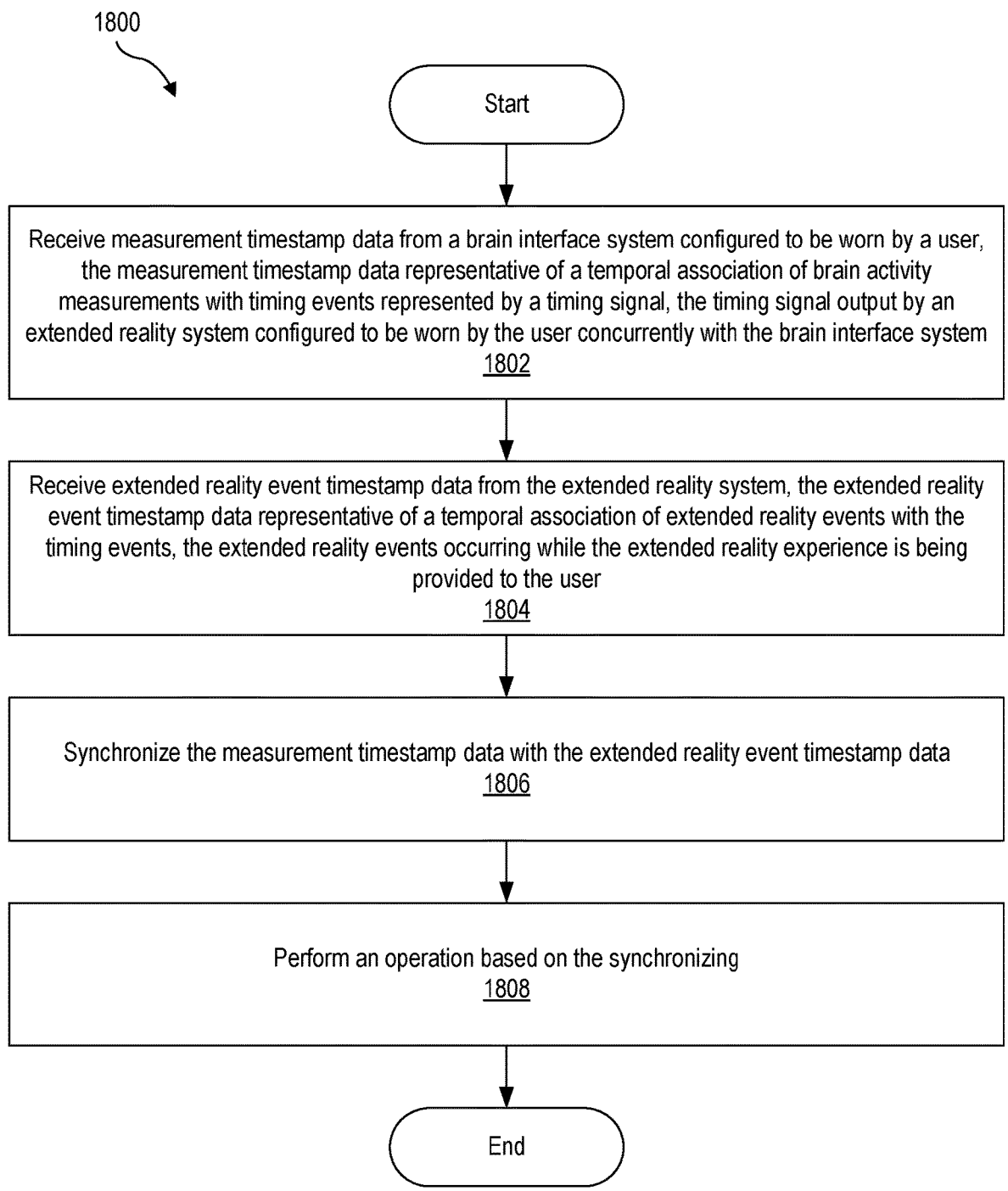

FIG. 18 illustrates an exemplary method 1800 that may be performed by any of the processing systems described herein. While FIG. 18 illustrates exemplary operations according to one embodiment, other embodiments may omit, add to, reorder, and/or modify any of the operations shown in FIG. 18. The operations shown in FIG. 18 may be performed in any of the ways described herein.

At operation 1802, a processing system receives measurement timestamp data from a brain interface system configured to be worn by a user, the measurement timestamp data representative of a temporal association of brain activity measurements with timing events represented by a timing signal, the timing signal output by an extended reality system configured to be worn by the user concurrently with the brain interface system.

At operation 1804, the processing system receives extended reality event timestamp data from the extended reality system, the extended reality event timestamp data representative of a temporal association of extended reality events with the timing events, the extended reality events occurring while the extended reality experience is being provided to the user.

At operation 1806, the processing system synchronizes the measurement timestamp data with the extended reality event timestamp data.

At operation 1808, the processing system performs an operation based on the synchronizing.

In some examples, a non-transitory computer-readable medium storing computer-readable instructions may be provided in accordance with the principles described herein. The instructions, when executed by a processor of a computing device, may direct the processor and/or computing device to perform one or more operations, including one or more of the operations described herein. Such instructions may be stored and/or transmitted using any of a variety of known computer-readable media.

A non-transitory computer-readable medium as referred to herein may include any non-transitory storage medium that participates in providing data (e.g., instructions) that may be read and/or executed by a computing device (e.g., by a processor of a computing device). For example, a non-transitory computer-readable medium may include, but is not limited to, any combination of non-volatile storage media and/or volatile storage media. Exemplary non-volatile storage media include, but are not limited to, read-only memory, flash memory, a solid-state drive, a magnetic storage device (e.g. a hard disk, a floppy disk, magnetic tape, etc.), ferroelectric random-access memory ("RAM"), and an optical disc (e.g., a compact disc, a digital video disc, a Blu-ray disc, etc.). Exemplary volatile storage media include, but are not limited to, RAM (e.g., dynamic RAM).

Figure 19:
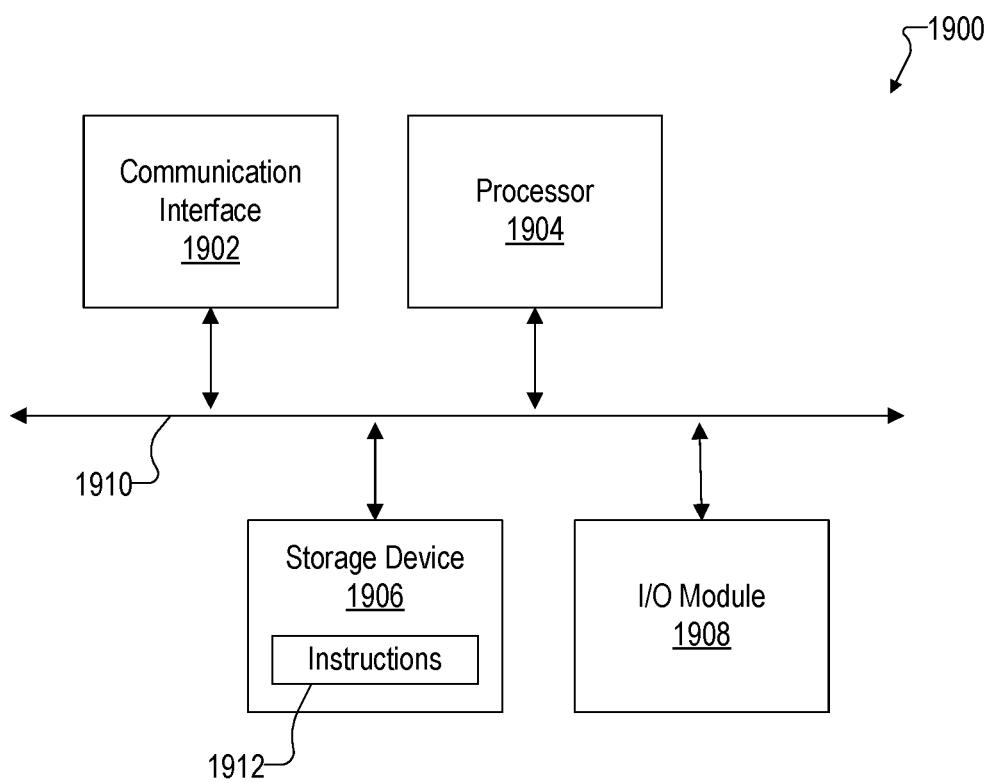
FIG. 19 illustrates an exemplary computing device.

FIG. 19 illustrates an exemplary computing device 1900 that may be specifically configured to perform one or more of the processes described herein. Any of the systems, units, computing devices, and/or other components described herein may be implemented by computing device 1900.

As shown in FIG. 19, computing device 1900 may include a communication interface 1902, a processor 1904, a storage device 1906, and an input/output ("I/O") module 1908 communicatively connected one to another via a communication infrastructure 1910. While an exemplary computing device 1900 is shown in FIG. 19, the components illustrated in FIG. 19 are not intended to be limiting. Additional or alternative components may be used in other embodiments. Components of computing device 1900 shown in FIG. 19 will now be described in additional detail.

Communication interface 1902 may be configured to communicate with one or more computing devices. Examples of communication interface 1902 include, without limitation, a wired network interface (such as a network interface card), a wireless network interface (such as a wireless network interface card), a modem, an audio/video connection, and any other suitable interface.

Processor 1904 generally represents any type or form of processing unit capable of processing data and/or interpreting, executing, and/or directing execution of one or more of the instructions, processes, and/or operations described herein. Processor 1904 may perform operations by executing computer-executable instructions 1912 (e.g., an application, software, code, and/or other executable data instance) stored in storage device 1906.

Storage device 1906 may include one or more data storage media, devices, or configurations and may employ any type, form, and combination of data storage media and/or device. For example, storage device 1906 may include, but is not limited to, any combination of the non-volatile media and/or volatile media described herein. Electronic data, including data described herein, may be temporarily and/or permanently stored in storage device 1906. For example, data representative of computer-executable instructions 1912 configured to direct processor 1904 to perform any of the operations described herein may be stored within storage device 1906. In some examples, data may be arranged in one or more databases residing within storage device 1906.

I/O module 1908 may include one or more I/O modules configured to receive user input and provide user output. I/O module 1908 may include any hardware, firmware, software, or combination thereof supportive of input and output capabilities. For example, I/O module 1908 may include hardware and/or software for capturing user input, including, but not limited to, a keyboard or keypad, a touchscreen component (e.g., touchscreen display), a receiver (e.g., a radio frequency or infrared receiver), motion sensors, and/or one or more input buttons.

I/O module 1908 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1908 is configured to provide graphical data to a display for presentation to a user. The graphical data may be representative of one or more graphical user interfaces and/or any other graphical content as may serve a particular implementation.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A system comprising:
an extended reality system configured to:
    be worn by a user,
    provide the user with an extended reality experience, and
    output a timing signal while the extended reality experience is being provided to the user, the timing signal representing a plurality of timing events that occur during the extended reality experience; and
a brain interface system configured to:
    be worn by the user concurrently with the extended reality system,
    receive the timing signal from the extended reality system while the extended reality experience is being provided to the user,
    acquire brain activity measurements while the extended reality experience is being provided to the user, and
    output measurement timestamp data representative of a temporal association of the brain activity measurements with the timing events;
wherein the brain interface system comprises an optical measurement system configured to perform optical-based brain data acquisition operations.

2. The system of claim 1, wherein the outputting of the measurement timestamp data comprises:
determining that a particular brain activity measurement included in the brain activity measurements is acquired during a particular timing event included in the plurality of timing events represented by the timing signal; and
including, in the measurement timestamp data, data indicating that the particular brain activity measurement is acquired during the particular timing event.

3. The system of claim 1, wherein the extended reality system is further configured to output extended reality event timestamp data representative of a temporal association of extended reality events with the timing events, the extended reality events occurring while the extended reality experience is being provided to the user.

4. The system of claim 3, wherein the extended reality events comprise one or more of a user input event provided by the user, an occurrence a visual event within the extended reality experience, or an occurrence of an audio event within the extended reality experience.

5. The system of claim 3, wherein the outputting of the extended reality event timestamp data comprises:
determining that a particular extended reality event included in the extended reality events occurs during a particular timing event included in the plurality of timing events represented by the timing signal; and
including, in the extended reality event timestamp data, data indicating that the particular extended reality event occurs during the particular timing event.

6. The system of claim 3, further comprising:
a processing system communicatively coupled to the extended reality system and the brain interface system, the processing system configured to:
receive the measurement timestamp data from the brain interface system,
receive the extended reality event timestamp data from the extended reality system,
synchronize the measurement timestamp data with the extended reality event timestamp data, and
perform an operation based on the synchronizing.

7. The system of claim 6, wherein the performing of the operation comprises presenting graphical content showing one or more regions of the brain that are activated in response to an occurrence of the extended reality events.

8. The system of claim 6, wherein the performing of the operation comprises monitoring a brain state of the user during the extended reality experience.

9. The system of claim 8, wherein the performing of the operation further comprises adjusting a parameter of the extended reality experience based on the brain state of the user.

10. The system of claim 9, wherein the adjusting of the parameter is configured to cause the extended reality system to adjust extended reality content being presented to the user during the extended reality experience.

11. The system of claim 6, wherein the performing of the operation comprises controlling a parameter of the extended reality experience.

12. The system of claim 11, wherein the controlling of the parameter of the extended reality experience comprises transmitting control data to the extended reality system, the control data configured to adjust the extended reality experience.

13. The system of claim 11, wherein the controlling of the parameter of the extended reality experience is configured to cause at least one of a visual cue or an audio cue to be presented to the user during the extended reality experience.

14. The system of claim 11, wherein the controlling of the parameter of the extended reality experience is configured to adjust a difficulty level of a task that is to be performed by the user within the extended reality experience.

15. The system of claim 6, wherein the synchronizing of the measurement timestamp data with the extended reality timestamp data comprises applying a timing offset to the measurement timestamp data to correlate the measurement timestamp data with the extended reality timestamp data.

16. The system of claim 6, wherein the synchronizing is performed in substantially real time while the extended reality experience is being provided to the user.

17. The system of claim 6, wherein the synchronizing is performed offline subsequent to the extended reality experience being provided to the user.

18. The system of claim 6, wherein the processing system is included in the brain interface system.

19. The system of claim 1, wherein the timing signal comprises an audio signal.

20. The system of claim 19, wherein:
the extended reality system is configured to output the audio signal by way of an output audio port; and
the brain interface system is configured to receive the audio signal by way of a cable that plugs into the output audio port.

21. The system of claim 1, wherein the extended reality experience comprises an immersive virtual reality experience.

22. The system of claim 1, wherein the extended reality experience comprises a non-immersive augmented reality experience.

23. The system of claim 1, wherein the optical measurement system comprises:
a wearable assembly configured to be worn by the user and comprising:
a plurality of light sources each configured to emit light directed at a brain of the user, and
a plurality of detectors configured to detect arrival times for photons of the light after the light is scattered by the brain.

24. The system of claim 23, wherein the wearable assembly further comprises:
a first module comprising a first light source included in the plurality of light sources and a first set of detectors included in the plurality of detectors; and
a second module physically distinct from the first module and comprising a second light source included in the plurality of light sources and a second set of detectors included in the plurality of detectors.

25. The system of claim 24, wherein the first and second modules are configured to be removably attached to the wearable assembly.

26. A system comprising:
an extended reality system configured to:
be worn by a user,
provide the user with an extended reality experience, and
output a timing signal while the extended reality experience is being provided to the user, the timing signal representing a plurality of timing events that occur during the extended reality experience, the timing signal comprising an audio signal; and
a brain interface system configured to:
be worn by the user concurrently with the extended reality system,
receive the timing signal from the extended reality system while the extended reality experience is being provided to the user,
acquire brain activity measurements while the extended reality experience is being provided to the user, and
output measurement timestamp data representative of a temporal association of the brain activity measurements with the timing events;
wherein the audio signal modulates between a first volume level and a second volume level to indicate the timing events.

27. A system comprising:
an extended reality system configured to:
 be worn by a user,
 provide the user with an extended reality experience, and
 output a timing signal while the extended reality experience is being provided to the user, the timing signal representing a plurality of timing events that occur during the extended reality experience; and
a brain interface system configured to:
 be worn by the user concurrently with the extended reality system,
 receive the timing signal from the extended reality system while the extended reality experience is being provided to the user,
 acquire brain activity measurements while the extended reality experience is being provided to the user, and
 output measurement timestamp data representative of a temporal association of the brain activity measurements with the timing events;
wherein the brain interface system comprises a multimodal measurement system configured to perform optical-based brain data acquisition operations and electrical-based brain data acquisition operations.

28. The system of claim 27, wherein the multimodal measurement system comprises:
a wearable assembly configured to be worn by the user and comprising:
 a plurality of light sources each configured to emit light directed at a brain of the user,
 a plurality of detectors configured to detect arrival times for photons of the light after the light is scattered by the brain, and
 a plurality of electrodes configured to be external to the user and detect electrical activity of the brain.

29. The system of claim 28, wherein the wearable assembly further comprises:
a first module comprising a first light source included in the plurality of light sources and a first set of detectors included in the plurality of detectors; and
a second module physically distinct from the first module and comprising a second light source included in the plurality of light sources and a second set of detectors included in the plurality of detectors.

30. The system of claim 29, wherein the plurality of electrodes comprises a first electrode on a surface of the first module and a second electrode on a surface of the second module.

31. The system of claim 30, wherein the first electrode surrounds the first light source on the surface of the first module.

32. A system comprising:
an extended reality system configured to:
 be worn by a user,
 provide the user with an extended reality experience, and
 output a timing signal while the extended reality experience is being provided to the user, the timing signal representing a plurality of timing events that occur during the extended reality experience; and
a brain interface system configured to:
 be worn by the user concurrently with the extended reality system,
 receive the timing signal from the extended reality system while the extended reality experience is being provided to the user,
 acquire brain activity measurements while the extended reality experience is being provided to the user, and
 output measurement timestamp data representative of a temporal association of the brain activity measurements with the timing events;
wherein the brain interface system comprises a magnetic field measurement system configured to perform magnetic field-based brain data acquisition operations.

33. The system of claim 32, wherein the magnetic field measurement system comprises a wearable sensor unit configured to be worn by a user and comprising a magnetometer configured to detect a magnetic field generated within a brain of the user.

* * * * *